United States Patent … Okada et al.

(10) Patent No.: US 11,275,729 B2
(45) Date of Patent: Mar. 15, 2022

(54) TEMPLATE SEARCH SYSTEM AND TEMPLATE SEARCH METHOD

(71) Applicant: Hitachi, Ltd., Tokyo (JP)

(72) Inventors: Masae Okada, Tokyo (JP); Yuki Naganuma, Tokyo (JP); Keisuke Hatasaki, Tokyo (JP); Toshio Nishida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 16/821,584

(22) Filed: Mar. 17, 2020

(65) Prior Publication Data

US 2020/0341973 A1 Oct. 29, 2020

(30) Foreign Application Priority Data

Apr. 26, 2019 (JP) .............................. JP2019-085974

(51) Int. Cl.
*G06F 16/242* (2019.01)
*G06F 16/2458* (2019.01)

(52) U.S. Cl.
CPC ........ *G06F 16/242* (2019.01); *G06F 16/2462* (2019.01)

(58) Field of Classification Search
CPC .................................................. G06F 16/242
See application file for complete search history.

(56) References Cited

U.S. PATENT DOCUMENTS

| 2002/0163518 | A1* | 11/2002 | Rising, III | H04N 21/2353 345/440 |
| 2008/0177994 | A1* | 7/2008 | Mayer | G06F 9/4418 713/2 |
| 2015/0142704 | A1* | 5/2015 | London | G06F 40/58 706/11 |
| 2017/0316059 | A1* | 11/2017 | Stetson | G06F 16/24566 |
| 2020/0294665 | A1* | 9/2020 | Neumann | G06N 5/02 |

FOREIGN PATENT DOCUMENTS

JP 2014-215826 A 11/2014

OTHER PUBLICATIONS

Mikolov T. et al, "Efficient Estimation of Word Representations in Vector Space", 2013, pp. 1-12, arXiv preprint arXiv:1301.3781v3 (12 pages).

* cited by examiner

*Primary Examiner* — Van H Oberly
(74) *Attorney, Agent, or Firm* — Crowell & Moring LLP

(57) ABSTRACT

To provide a template search system capable of appropriately searching for templates. In the template search system that manages information of templates and information of nodes used in the templates in an associated manner, provided are: a processing unit that calculates a synonym for an inputted search word and/or flow showing linkage of the nodes used in the template related to the search word based on the information of the nodes managed by the template search system, and specifies the template associated with the calculated synonym and/or the template having a flow corresponding to the calculated flow based on the information of the templates managed by the template search system; and an output unit that outputs the information of the template specified by the processing unit.

12 Claims, 28 Drawing Sheets

FIG.3C

| 320 | 321 | | 322 |
|---|---|---|---|
| FLOW TEMPLATE NAME | | | FLOW TEMPLATE CATEGORY |

FLOW TEMPLATE OUTLINE

323 — 324 DESCRIPTION | 326 FLOW | 327 RELATED MATERIAL | 328 DOWNLOAD

325:

THIS FLOW IS ...

BACKGROUND OF DEVELOPMENT
  RECENTLY, ...
PURPOSE OF DEVELOPMENT
  THE PURPOSE OF THE FLOW IS ...
EXAMPLE OF APPLIED SCENE
  AN EXAMPLE OF APPLIED SCENE OF THE FLOW IS ...
INSTRUCTIONS
  FIRST, ...

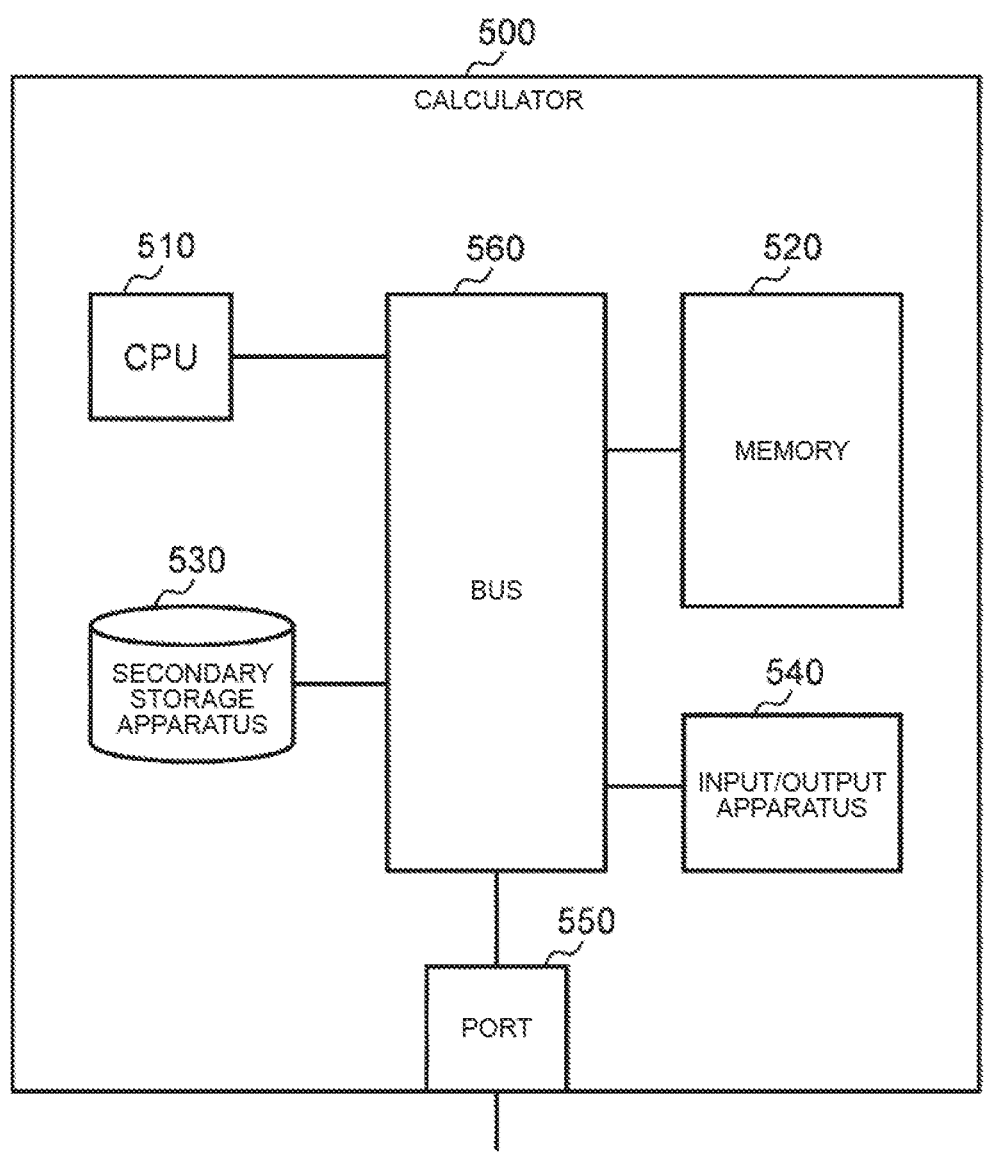

FIG. 7A

FLOW TEMPLATE TABLE (111)

| FLOW TEMPLATE ID | FLOW TEMPLATE NAME | FLOW TEMPLATE OUTLINE | FLOW TEMPLATE DESCRIPTION | CATEGORY | FLOW ID | CONTENTS ID | REGISTRATION DATE |
|---|---|---|---|---|---|---|---|
| flowtpl-001 | TEMPLATE 1 | THIS TEMPLATE IS ... | THIS TEMPLATE IS ... | ftcat-a | flow-001 | contents-001 | yyyy/mm/dd |
| flowtpl-002 | TEMPLATE 2 | THIS TEMPLATE IS ... | THIS TEMPLATE IS ... | ftcat-b | flow-002 | contents-002 | yyyy/mm/dd |
| flowtpl-003 | TEMPLATE 3 | THIS TEMPLATE IS ... | THIS TEMPLATE IS ... | ftcat-c | flow-003 | contents-003 | yyyy/mm/dd |
| flowtpl-004 | TEMPLATE 4 | THIS TEMPLATE IS ... | THIS TEMPLATE IS ... | ftcat-d | flow-004 | contents-004 | yyyy/mm/dd |
| flowtpl-005 | TEMPLATE 5 | THIS TEMPLATE IS ... | THIS TEMPLATE IS ... | ftcat-e | flow-005 | contents-005 | yyyy/mm/dd |
| 701 | 702 | 703 | 704 | 705 | 706 | 707 | 708 |

FLOW TABLE

| FLOW ID | NODE ID | NODE COUPLING RELATION 713 ||| INSTANCE OBJECT INFORMATION |
|---|---|---|---|---|---|
| | | NODE IDENTIFICATION ID | INPUT | OUTPUT | |
| flow-001 | node-001 | flow001-node001 | - | flow001-node002 | {..,..,..} |
| | node-002 | flow001-node002 | flow001-node001 | flow001-node003 | {..,..,..} |
| | node-003 | flow001-node003 | flow001-node002 | flow001-node003 | {..,..,..} |
| | node-002 | flow001-node004 | flow001-node003 | flow001-node005 | {..,..,..} |
| | node-005 | flow001-node005 | flow001-node004 | - | {..,..,..} |
| flow-002 | node-001 | flow002-node001 | - | flow002-node002 | {..,..,..} |
| | node-003 | flow002-node002 | flow002-node001 | flow002-node003 | {..,..,..} |
| ⋮ | ⋮ | ⋮ | ⋮ | ⋮ | ⋮ |

CONTENTS TABLE

| CONTENTS ID | CONTENTS |
|---|---|
| contents-001 | contents-a.pdf |
| contents-002 | contents-b.jpg |
| contents-003 | contents-c.pptx |
| contents-004 | contents-d.docx |
| contents-005 | contents-e.xlsx |
| contents-006 | contents-f.txt |
| contents-007 | contents-g.md |

613 — USED-NODE LIST

| USED-NODE ID | NUMBER OF USE |
|---|---|
| node-001 | 63 |
| node-002 | 19 |
| node-003 | 126 |
| node-005 | 87 |

614 — SYNONYM LIST — SEARCH WORD 741

| SYNONYM | SIMILARITY |
|---|---|
| synonym-a | 0.993 |
| synonym-b | 0.987 |
| synonym-c | 0.982 |
| synonym-d | 0.975 |

615 — DISPLAY FLOW TEMPLATE LIST

| FLOW TEMPLATE ID | SCORE | SEARCH RESULT DISPLAY DETERMINATION |
|---|---|---|
| flowtpl-001 | 15.5 | True |
| flowtpl-002 | 0 | False |
| flowtpl-003 | 8.0 | False |
| flowtpl-004 | 14.0 | True |

616 — NODE IMPORTANCE LIST

| USED-NODE ID | IMPORTANCE | DETERMINATION |
|---|---|---|
| node-001 | 63 | False |
| node-002 | 19 | True |
| node-003 | 126 | False |
| node-005 | 87 | True |

| FLOW ID | NODE ID | ABSTRACT FLOW LIST 773 | | | INSTANCE OBJECT INFORMATION |
|---|---|---|---|---|---|
| | | NODE COUPLING RELATION | | | |
| | | NODE IDENTIFICATION ID | INPUT | OUTPUT | |
| flow-100 | node-002 | NODE B | - | NODE C | {...,...,...} |
| | node-003 | NODE C | NODE B NODE H | NODE B NODE K | {...,...,...} |
| | node-005 | NODE E | NODE C | NODE G | {...,...,...} |
| | node-007 | NODE G | NODE E | - | {...,...,...} |
| | node-008 | NODE H | - | NODE C | {...,...,...} |
| | node-011 | NODE K | NODE C | - | {...,...,...} |

| | | | NODE COUPLING RELATION | | | |
|---|---|---|---|---|---|---|
| FLOW ID | SPLIT ID | NODE ID | NODE IDENTIFI-CATION ID | INPUT | OUTPUT | INSTANCE OBJECT INFORMATION |
| flow-100 | flowspl-100-1 | node-002 | NODE B | - | NODE C | {...,...,...} |
| | | node-003 | NODE C | NODE B | NODE E | {...,...,...} |
| | | node-005 | NODE E | NODE C | NODE G | {...,...,...} |
| | | node-007 | NODE G | NODE E | - | {...,...,...} |
| | flowspl-100-2 | node-002 | NODE B | - | NODE C | {...,...,...} |
| | | node-003 | NODE C | NODE B | NODE K | {...,...,...} |
| | | node-011 | NODE K | NODE C | - | {...,...,...} |
| | flowspl-100-3 | node-008 | NODE H | - | NODE C | {...,...,...} |
| | | node-003 | NODE C | NODE B | NODE E | {...,...,...} |
| | | node-005 | NODE E | NODE C | NODE G | {...,...,...} |
| | | node-007 | NODE G | NODE E | - | {...,...,...} |
| | flowspl-100-4 | node-008 | NODE H | - | NODE C | {...,...,...} |
| | | node-003 | NODE C | NODE B | NODE K | {...,...,...} |
| | | node-011 | NODE K | NODE C | - | {...,...,...} |

SPLIT FLOW LIST — 784, 618

SIMILAR FLOW TEMPLATE LIST — 619

| TEXT SEARCH FLOW TEMPLATE ID | SIMILAR SIMPLIFIED FLOW ID | SIMILAR FLOW TEMPLATE ID | FLOW SIMILARITY | SEARCH RESULT DISPLAY DETERMINATION |
|---|---|---|---|---|
| flowtpl-001 | flowspl-011-2 | flowtpl-011 | 12 | True |
| | flowspl-037-5 | flowtpl-037 | 16 | False |
| flowtpl-004 | flowspl-007-1 | flowtpl-007 | 8 | True |
| | flowspl-023-2 | flowtpl-023 | 17 | True |

NODE TABLE (121)

| NODE ID | NODE CATEGORY ID | NODE NAME | NODE DESCRIPTION | EXTERNAL SERVICE ID | PROCESSING CODE |
|---|---|---|---|---|---|
| node-001 | nodecat-001 | node-a | THIS NODE IS .. | exsvc-1 | {...} |
| node-002 | nodecat-002 | node-b | THIS NODE IS .. | False | {...} |
| node-003 | nodecat-003 | node-c | THIS NODE IS .. | False | {...} |
| node-004 | nodecat-004 | node-d | THIS NODE IS .. | exsvc-2 | {...} |
| node-005 | nodecat-005 | node-e | THIS NODE IS .. | exsvc-3 | {...} |

NODE CATEGORY TABLE (622)

| NODE CATEGORY ID | CATEGORY NAME |
|---|---|
| nodecat-001 | INPUT |
| nodecat-002 | CONVERSION |
| nodecat-003 | CALCULATION |
| nodecat-004 | DRAWING |
| nodecat-005 | OUTPUT |

EXTERNAL SERVICE TABLE (623)

| EXTERNAL SERVICE ID | EXTERNAL SERVICE NAME | COUPLING INFORMATION |
|---|---|---|
| exsvc-1 | EXTERNAL SERVICE | {...} |
| exsvc-2 | EXTERNAL SERVICE | {...} |
| exsvc-3 | EXTERNAL SERVICE | {...} |

821 / 822 / 823

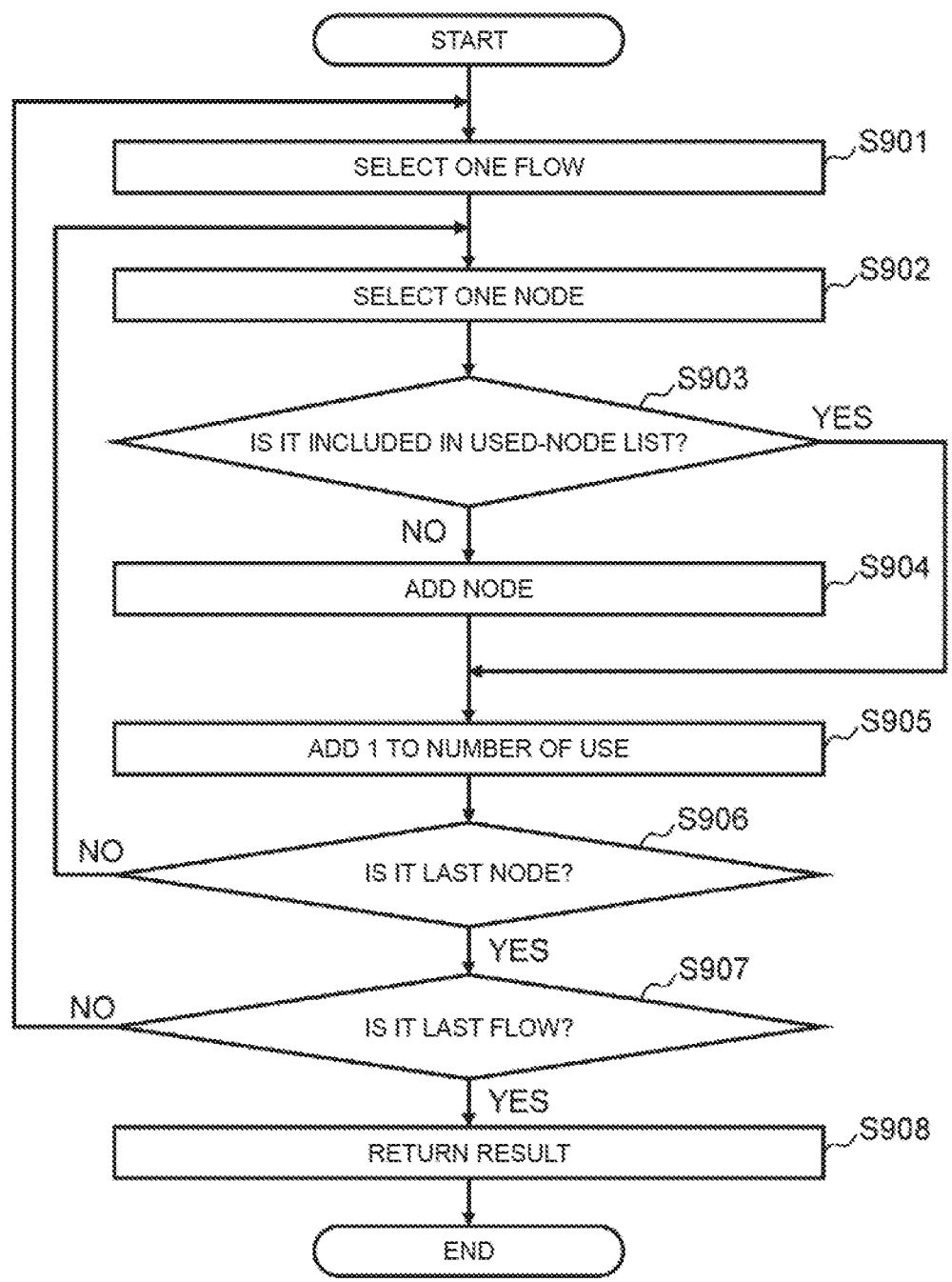

FIG.17A

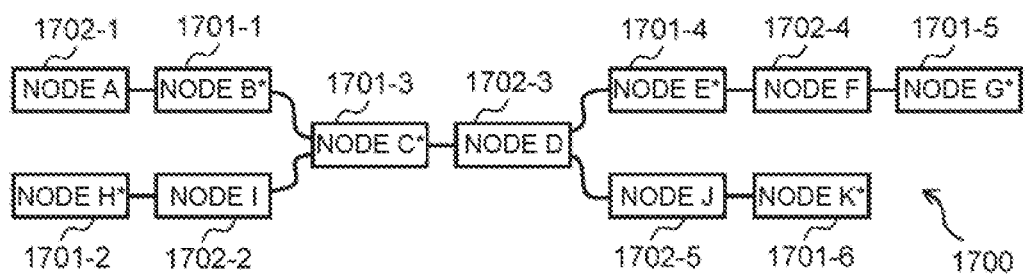

FIG.17B

ABSTRACT FLOW LIST (BEFORE EXECUTION OF PROCESSING) 1710

| FLOW ID | NODE ID | NODE COUPLING RELATION | | | INSTANCE OBJECT INFORMATION |
|---|---|---|---|---|---|
| | | NODE IDENTIFICATION ID | INPUT | OUTPUT | |
| flow-100 | node-001 | NODE A | - | NODE B | {...,...,...} |
| | node-002 | NODE B | NODE A | NODE C | {...,...,...} |
| | node-003 | NODE C | NODE B NODE I | NODE D | {...,...,...} |
| | node-004 | NODE D | NODE C | NODE E NODE J | {...,...,...} |
| | node-005 | NODE E | NODE D | NODE F | {...,...,...} |
| | node-006 | NODE F | NODE E | NODE G | {...,...,...} |
| | node-007 | NODE G | NODE F | - | {...,...,...} |
| | node-008 | NODE H | - | NODE I | {...,...,...} |
| | node-009 | NODE I | NODE H | NODE C | {...,...,...} |
| | node-010 | NODE J | NODE D | NODE K | {...,...,...} |
| | node-011 | NODE K | NODE J | - | {...,...,...} |

771  772  773-1  773-2  773-3  774

TEMPLATE SEARCH SYSTEM AND TEMPLATE SEARCH METHOD

BACKGROUND OF THE INVENTION

Field of the Invention

The present invention relates to a template search system and a template search method, and is suitable to be applied to a template search system and a template search method capable of searching for a template, for example.

Description of the Related Art

Among programming tools, there are visual programming tools with which an application program (application) can be developed by writing a model chart without writing source codes. An example thereof may be Node-RED (https://nodered.org/). When developing software by using a visual programming tool, information corresponding to its usage, environment, and other conditions is set as attribute values (properties) as necessary for nodes expressing various kinds of processing, and a flow configured with lines showing relations between the nodes (for example, a flow of processing) is generated. An example of the attribute value may be where the information is acquired from, and an example of the relation between the nodes may be a flow of data. By the use of such visual programming tools, developers can intuitively develop an application for executing intended processing without having sufficient knowledge about software development.

Further, in the fields of software development, examples (templates) of applications prepared in advance are often used to shorten the period required for development. The developer of an application can efficiently develop the application by acquiring a template closest to the purpose from a list of templates and altering necessary parts to shorten the period required for development.

A similar method can be applied for developing flows by using a visual programming tool.

[PTL 1] Japanese Unexamined Patent Application Publication No. 2014-215826

By the use of the template, it becomes unnecessary for the developer of a new application to do layout of nodes and arrangement of lines between the nodes from a scratch when developing software using the visual programming tool so that the application is expected to be developed promptly and easily. For that, it is necessary to first search for and select the template suited for the purpose from a database where a plurality of templates are accumulated.

When there are texts affixed for describing the contents of the templates registered in the database in such case, the developer of the application can search for the template by running a text search. However, when there is a difference in the background, knowledge, and the like among a plurality of users such as registrants and developers, words and phrases to be used vary so that it may not be possible to search for the template suited for the purpose.

In PTL 1, disclosed is a technique with which properties showing characteristics of commodities are defined in advance on a commodity list of a shop for running a text search by considering the properties. With the technique disclosed in PTL 1, it is expected to improve the issues in terms of searching caused due to variations in used words and phrases among a plurality of users by the use of property information registered in advance.

In PTL 1, however, it is supposed that the property information is registered in advance, and the method thereof is not disclosed. Therefore, when the searching method of PTL 1 is applied for searching for a template of an application, it becomes difficult to search for the template suited for the purpose if the information desired by the developer of the new application is left out from registration of the property information.

The present invention is designed in view of the aforementioned problem, and it is an object thereof to propose a template search system capable of properly searching for a template.

SUMMARY OF THE INVENTION

In order to overcome such problem, a template search system according to the present invention manages information of templates and information of nodes used in the templates in an associated manner, and includes:

a processing unit that calculates a synonym for an inputted search word and/or a flow showing linkage of the nodes used in the template related to the search word based on the information of the nodes managed by the template search system, and specifies the template associated with the calculated synonym and/or the template having a flow corresponding to the calculated flow based on the information of the templates managed by the template search system; and an output unit that outputs the information of the template specified by the processing unit.

With the above configuration, the template associated with the synonym and/or the template having the flow corresponding to the flow of the template related to the search word is searched as the template similar to the template corresponding to the search word. For example, even if there is a difference in the background, knowledge, and the like among the users so that words and phrases to be used as the search words vary, the users can acquire the template suited for the purpose thereof because the templates similar to the template corresponding to the search word are searched.

With the present invention, it is possible to properly search for the template.

BRIEF DESCRIPTION OF THE DRAWINGS

FIG. 3C is a diagram showing an example of the screen according to the first embodiment;

FIG. 5 is a diagram showing an example of a configuration of a calculator according to the first embodiment;

FIG. 7A is a chart showing an example of a flow template table according to the first embodiment;

FIG. 7B is a chart showing an example of a flow table according to the first embodiment;

FIG. 7C is a chart showing an example of a contents table according to the first embodiment;

FIG. 7D is a chart showing an example of a used-node list according to the first embodiment;

FIG. 7E is a chart showing an example of a synonym list according to the first embodiment;

FIG. 7F is a chart showing an example of a display flow template list according to the first embodiment;

FIG. 7G is a chart showing an example of a node importance list according to the first embodiment;

FIG. 7H is a chart showing an example of an abstract flow list according to the first embodiment;

FIG. 7I is a chart showing an example of a split flow list according to the first embodiment;

FIG. 7J is a chart showing an example of a similar flow template list according to the first embodiment;

FIG. 8A is a chart showing an example of a node table according to the first embodiment;

FIG. 8B is a chart showing an example of a node category table according to the first embodiment;

FIG. 8C is a chart showing an example of an external service table according to the first embodiment;

FIG. 9 is a chart showing an example of a flowchart related to processing executed by a used-node extraction processing unit according to the first embodiment;

FIG. 17A is a diagram for describing simplification of a flow according to the first embodiment;

FIG. 17B is a chart for describing simplification of a flow according to the first embodiment;

DETAILED DESCRIPTION OF THE PREFERRED EMBODIMENTS

Embodiments of the present invention will be described in detail in the following by referring to the accompanying drawings. The embodiments relate to a technique that supports searches for model patterns (templates) of applications created by a visual programming tool. With the technique shown in the embodiments, for example, a search is run based on a similarity relation among words analogized from information of templates describing contents of the templates and information of nodes used in the templates. Further, for example, a search is run based on a similarity relation of flows analogized from the important nodes within the flows and input/output relations. Such search makes it possible to have the information not registered in texts affixed to the templates supplemented from the applications, so that it is possible to present a template that is more suited for the purpose of users. Hereinafter, details thereof will be described.

In the following explanations, it is to be noted that a common part (part excluding suffix number) of a reference sign having a suffix number may be used when discussing without distinguishing same-kind elements, while a reference sign including a suffix number may be used when discussing by distinguishing the same-kind elements. For example, users may be expressed as "user 140" when discussing without specifically distinguishing the users, while the users may be expressed as "user 140-1", "user 140-2", and the like when discussing by distinguishing the individual users.

First Embodiment

Figure 1:
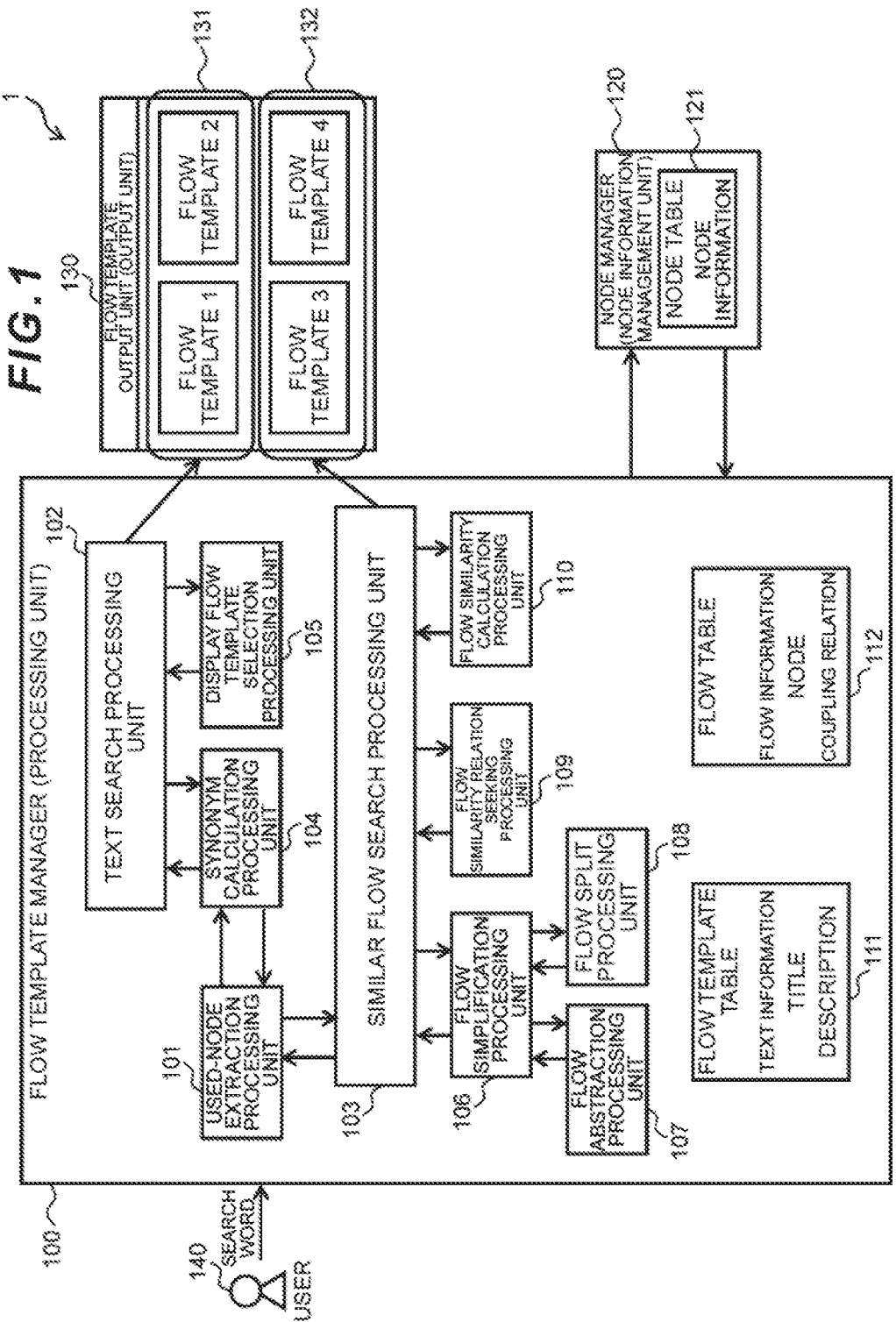
FIG. 1 is a diagram for describing an outline of a template search system according to a first embodiment.

In FIG. 1, numeral sign 1 denotes a template search system as a whole according to the first embodiment.
<Explanation of System>

The outline of the template search system 1 will be described by referring to FIG. 1.

The template search system 1 is configured including: a flow template manager 100 that stores and searches for, for example, flow templates (an example of templates); and a node manager 120 that manages nodes of a visual programming tool.

The flow template manager 100 includes a used-node extraction processing unit 101, a text search processing unit 102, a similar flow search processing unit 103, a synonym calculation processing unit 104, a display flow template selection processing unit 105, a flow simplification processing unit 106, a flow abstraction processing unit 107, a flow split processing unit 108, a flow similarity relation seeking processing unit 109, a flow similarity calculation processing unit 110, a flow template table 111, and a flow table 112. The node manager 120 includes a node table 121.

The template search system 1 is a system that supports a search for flow templates managed by the flow template manager 100 based on a search word inputted by a user 140 for searching for a flow template. Outlines of each processing unit configuring the technique for supporting such search will be described hereinafter.

The used-node extraction processing unit 101 acquires information of the flow table 112, and extracts the nodes used in the flow templates. Thereby, the information used for searching for the flow templates can be selectively acquired from a vast amount of node information managed by the node manager 120, so that it is possible to make a careful selection of the information to be used.

The text search processing unit 102 calls the synonym calculation processing unit 104 and the display flow template selection processing unit 105, and executes flow template search processing based on the text information.

The synonym calculation processing unit 104 calls the used-node extraction processing unit 101, acquires the text information regarding the extracted nodes from the node table 121 of the node manager 120, and calculates similarity relations between the words from the acquired information of the nodes and the text information acquired from the flow template table 111. By the use of the information of the nodes used in the flow templates and the information of the flow templates, it is possible to reflect the manner of use and the like of terms and words peculiar to each of the flow templates upon the similarity relations of the words without having each of the words registered in advance. Further, the synonym calculation processing unit 104 calculates a synonym for the search word based on the similarity relations between the words acquired by the processing described above.

The display flow template selection processing unit 105 searches for the flow template from the synonym and the search word acquired as a result of the processing executed by the synonym calculation processing unit 104. By running a search for the flow template based on the synonym for the search word, it is possible to search for the flow template by considering variations in the phrases used among a plurality of users such as registrants and developers. Further, by the use of a result of the processing executed by the synonym calculation processing unit 104 that calculates the similarity relations of the words by using the information of the nodes used in the flow templates and the information of the flow templates, it is possible to run a search designated for the flow template.

The similar flow search processing unit 103 calls the used-node extraction processing unit 101, the flow simplification processing unit 106, the flow similarity relation seeking processing unit 109, and the flow similarity calculation processing unit 110, seeks the similarity relations between the flows based on the flow information, and runs a search for the flow template based on the result thereof.

The flow simplification processing unit 106 calculates the importance of functions of the nodes extracted by the similar flow search processing unit 103 in the flows based on the flow table 112 and the node table 121, and calls the flow abstraction processing unit 107 to execute abstraction processing by expressing the flows with the important nodes.

Further, the flow simplification processing unit 106 calls the flow split processing unit 108, and splits the flows abstracted by the flow abstraction processing unit 107 into each pair of input and output.

By performing the processing of the flow abstraction processing unit 107 based on the calculation result of the importance of the nodes, a flow with the nodes performing characteristic processing within the flow can be generated, thereby making it easy to comprehend how the processing of the entire flow goes. Further, by splitting the flow by the flow split processing unit 108, it is possible to run a partial flow search.

The flow similarity relation seeking processing unit 109 seeks for the similarity relations between the flows simplified by the processing of the flow simplification processing unit 106. The flow similarity calculation processing unit 110 quantitatively acquires the similarity of the pairs of the flows that are acknowledged to have a similarity relation as a result of the processing of the flow similarity relation seeking processing unit 109.

By executing the processing described above, the similar flow search processing unit 103 becomes capable of running a search for the flow template based on the flow processing contents.

The flow template manager 100 includes a flow template output unit 130. The flow template output unit 130 outputs, for example, a flow template 131 acquired as a result of the processing executed by the text search processing unit 102 and a flow template 132 having the flow similar to the flow template 131 acquired as a result of the processing executed by the similarity flow search processing unit 103 (for example, displays a screen of a flow template list). Note here that the flow template 132 is one of outputs that cannot be searched by a simple word search, which characterizes the template search system 1.

Note that the processing to be executed by the flow simplification processing unit 106 may be configured to execute either one of the processing of the flow abstraction processing unit 107 that shows the flow with the important nodes and the processing of the flow split processing unit 108 that splits the flow into each pair of input and output. Further, it is also possible to perform calculations of the similarity relations of the flows by the flow similarity relation seeking processing unit 109 and the flow similarity calculation processing unit 110 without performing the processing of the flow simplification processing unit 106.

Further, the flow template output unit 130 is not limited to the configuration that displays the flow template 131 and the flow template 132 acquired as a result but may be configured to provide the flow template 131 and the flow template 132 to the user 140 as data.

Figure 2:
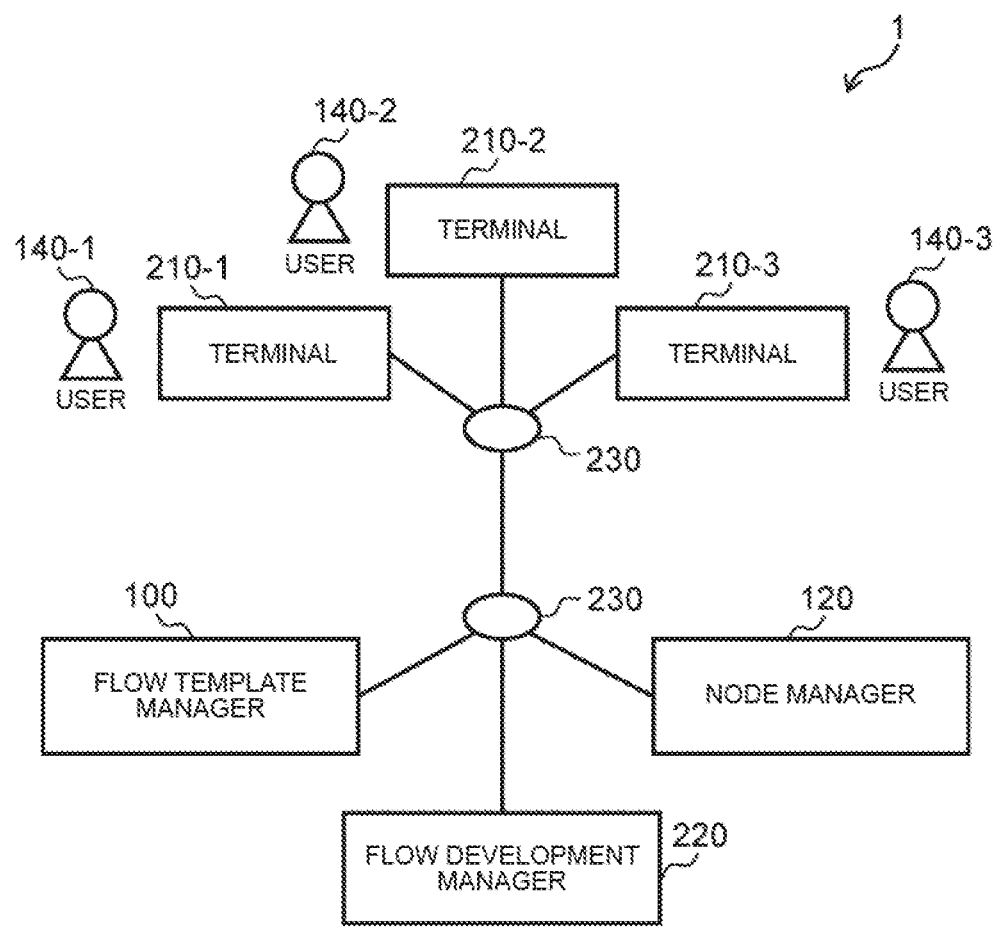
FIG. 2 is a diagram showing an example of a configuration of the template search system according to the first embodiment.

FIG. 2 is a diagram showing an example of the configuration of the template search system 1. In the template search system 1, the flow template manager 100, the node manager 120, terminals 210 operated by the respective users 140, and a flow development manager 220 are coupled to be communicable via network switches 230.

The user 140 can search for the template, acquire the data of the flow template, and the like by accessing to the flow template manager 100 by a client program 601 that is described later and operated in the terminal 210.

The flow template manager 100 has a flow template display function (GUI), a flow template management function, and a flow template search function. Details of the functions of the flow template manager 100 will be described later.

The node manager 120 has a management function of the nodes of the visual programming tool. The node manager 120 provides the node information to the flow template manager 100, provides the node information to the flow development manager 220, and performs registration, deletion, update, and the like of the nodes. An example of the node manager 120 for Node-RED described above may be npm repository (https://www.npmjs.com/search?q=keywords:node-red).

The flow development manager 220 has a flow execution environment and a flow editor GUI. Details of the flow development manager 220 will be described later.

<Explanation of Screen>

Figure 3A:
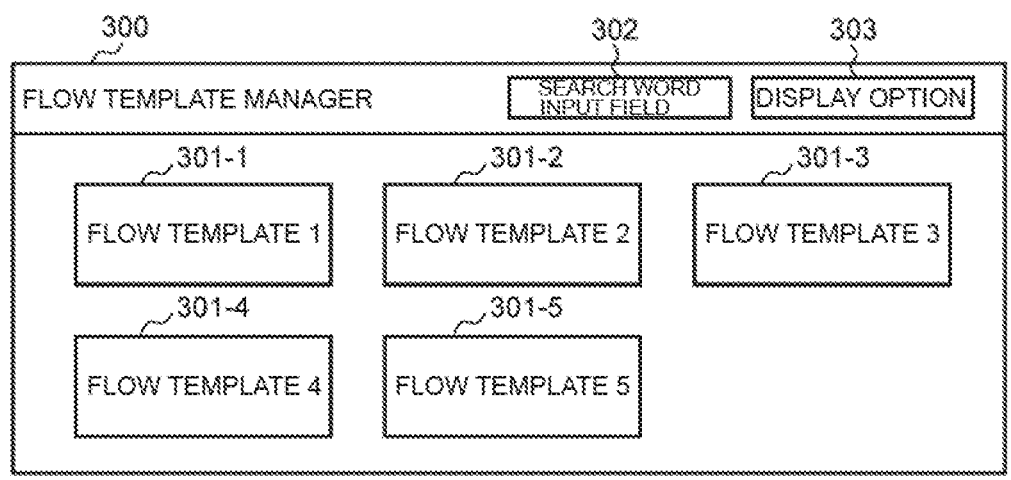
FIG. 3A is a diagram showing an example of a screen according to the first embodiment.
Figure 3B:
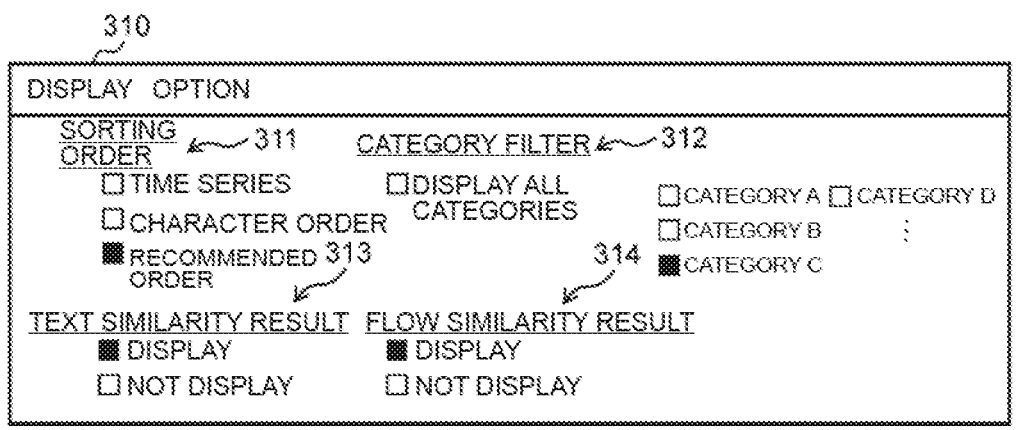
FIG. 3B is a diagram showing an example of the screen according to the first embodiment.

FIG. 3A to FIG. 3C are diagrams showing examples of the GUI (the screen outputted by the flow template output unit 130 and displayed on the terminal 210 of the user 140) of the flow template manager 100. With a flow template list screen 300 shown in FIG. 3A being a home screen, a display option selection screen 310 shown in FIG. 3B, a flow template information display screen 320 shown in FIG. 3C, and the like open by screen operations of the user 140.

The flow template list screen 300 is an example of the screen displaying the flow templates. On the flow template list screen 300, searched flow templates 301 are displayed.

The user 140 can search for the registered templates by inputting a search word into a search word input field 302 displayed on the flow template list screen 300. When the searched flow template 301 is clicked via a mouse on the flow template list screen 300, the flow template information display screen 320 opens. When a display option 303 on the flow template list screen 300 is clicked via the mouse, a display option selection screen 310 opens.

The display option selection screen 310 is an example of a screen for selecting a display option when displaying the searched result of the flow templates.

The user 140 can designate a sorting order 311. Note that the character order in the sorting order 311 means the flow templates are sorted according to a predetermined character order. For example, the character order in the sorting order 311 means Japanese syllabary order in Japanese, and means alphabetical order in English. Further, the user 140 can select a category filter 312, and narrow down the flow templates to be displayed according to categories associated with the flow templates. Further, the user 140 can select whether or not to display a text similarity result 313 that is a result of search executed by the text search processing unit 102 and whether or not to display a flow similarity result 314 that is a result of search executed by the similar flow search processing unit 103. Thereby, the user 140 can narrow down the vast amount of searched result, so that it becomes easier to find the target flow template.

The flow template information display screen 320 is an example of a screen for displaying the flow template information and for downloading the data of the flow template.

The user 140 can refer to a flow template name 321, a flow template category 322, and the like. On a flow template outline screen 323, the user 140 can refer to the outline of the template. Further, on a description screen 324, the user 140 can refer to the detailed description such as the contents of the flow template, the background of development, the purpose, an example of applied scene thereof, and the like in a description display area 325. Further, from a flow image screen 326 and a related material 327, the user 140 can refer to flow image information and acquire contents such as documents. Furthermore, the user 140 can download the data of the flow template by clicking a download button 328. By deploying the downloaded data on an execution environment of the visual programming, the application can be operated.

Figure 4:
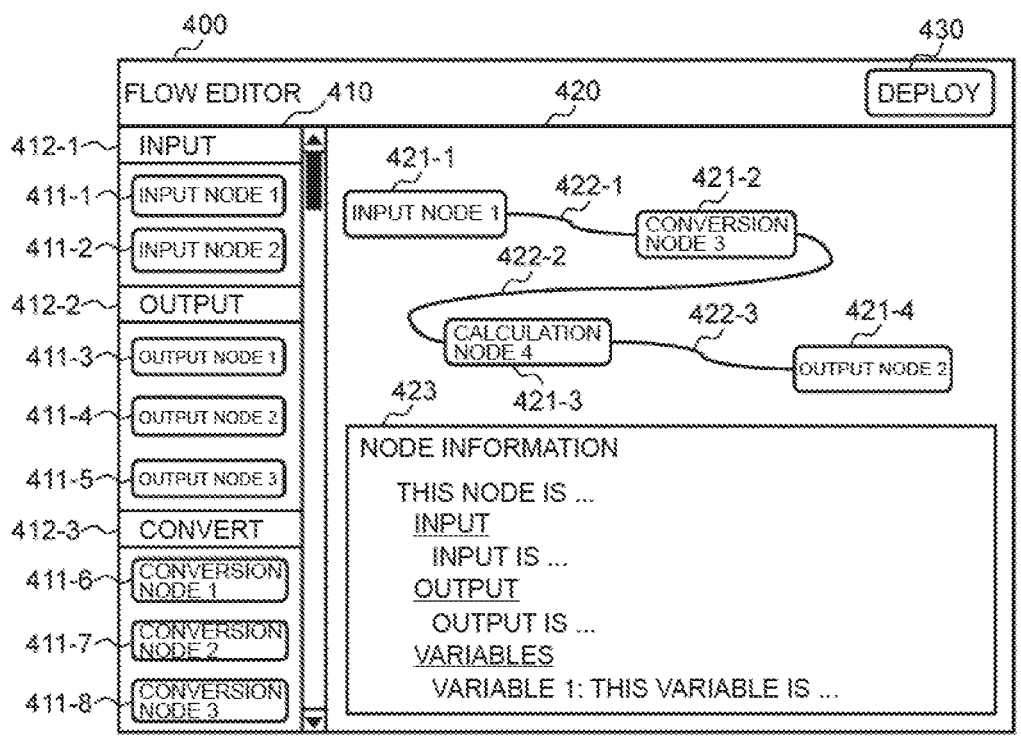
FIG. 4 is a diagram showing an example of the screen according to the first embodiment.

FIG. 4 is a diagram showing an example of the GUI (flow editor screen 400) for developing a flow of the visual programming. The flow editor screen 400 is provide to the terminal 210 by the flow development manager 220.

On the flow editor screen 400, a list screen 410 of useable nodes and a flow editing screen 420 for developing a flow are provided. On the list screen 410, useable nodes 411 are displayed in a form of list. In a case where the nodes are categorized, those are displayed on the list by each category 412.

Development of the flow is done on the flow editing screen 420. By dragging and dropping the nodes 411 of the flow from the list screen 410 to the flow editing screen 420, the nodes become useable (nodes 421). Further, by coupling the nodes 421 by lines 422 by a drag operation done via the mouse, the processing order of the nodes 421 can be defined.

For example, in the flow shown in FIG. 4, when the processing of the node 421-2 ends, processing of the node 421-3 coupled via the line 422-2 on the right side of the node 421-2 is then executed.

When the user 140 clicks the node 421, a node information display screen 423 opens. It is possible to refer to the information of the node 421 on the node information display screen 423, and the user 140 develops the flow with reference to the contents of the node information display screen 423. For example, on the node information display screen 423, it is possible to refer to details of the function of the node 421, details of an input value, details of an output value, description of variables, and the like.

<Explanation of Calculator>

FIG. 5 is a diagram showing an example of a configuration of a calculator 500 that can implement functions of the components (the terminals 210, the flow template manager 100, the node manager 120, and the flow development manager 220) shown in FIG. 2.

The calculator 500 includes: a CPU (Central Processing unit) 510 that is a processor; a memory 520 that is a main storage device; a nonvolatile secondary storage apparatus 530; an input/output apparatus 540; and a port 550. Each of these structural components is coupled mutually via a bus 560.

The CPU 510 is an example of a control apparatus, and implements a prescribed function of the calculator 500 by executing a program stored in the memory 520. The memory 520 stores programs executed by the CPU 510 and data necessary for executing the programs. The programs are loaded on the memory 520 from the secondary storage apparatus 530. Note that the memory 520 and the secondary storage apparatus 530 are examples of the storage apparatus.

The input/output apparatus 540 includes a single or a plurality of devices such as a display, a pointer, and a keyboard. The user 140 can operate the calculator 500 by the input/output apparatus 540.

The port 550 is coupled to a network (for example, the network switch 230 of FIG. 2). The calculator 500 can communicate with other calculators 500 via the port 550. Note that each of the calculators 500 operated by the respective components may be a virtual environment such as a virtual machine or a container.

<Explanation of Data Configuration of Storage Apparatus>

Figure 6A:
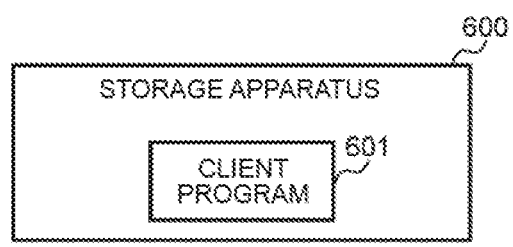
FIG. 6A is a diagram showing an example of information stored in a storage apparatus according to the first embodiment.
Figure 6B:
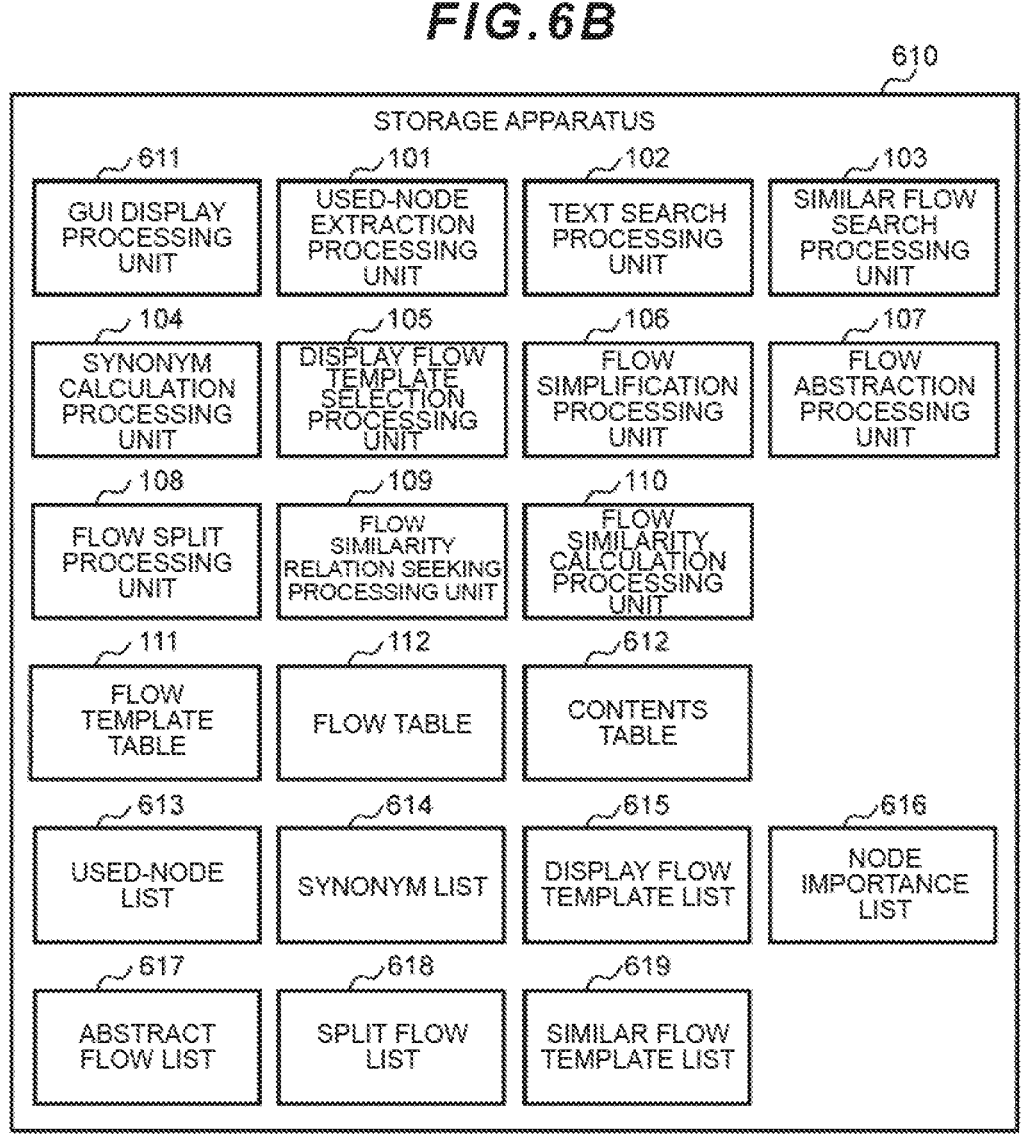
FIG. 6B is a diagram showing an example of the information stored in the storage apparatus according to the first embodiment.
Figure 6C:
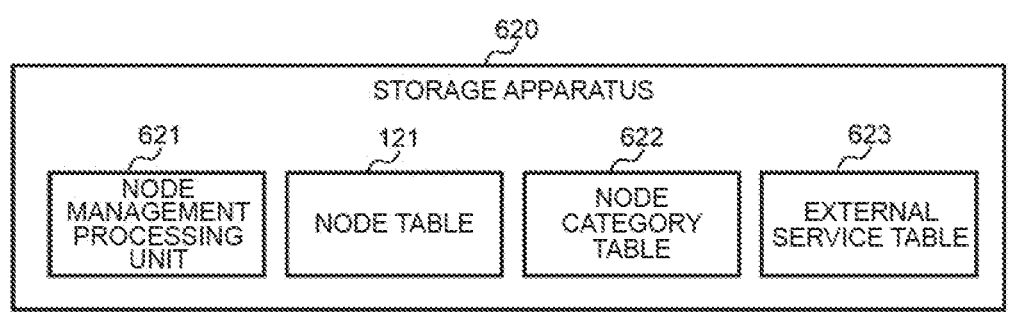
FIG. 6C is a diagram showing an example of the information stored in the storage apparatus according to the first embodiment.
Figure 6D:
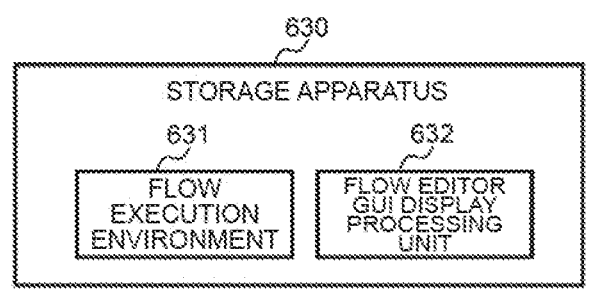
FIG. 6D is a diagram showing an example of the information stored in the storage apparatus according to the first embodiment.

FIG. 6A to FIG. 6D are diagrams showing examples of the information (the programs, the data, and the like stored in the memory 520 or the secondary storage apparatus 530) stored in the storage apparatuses of the calculators 500. FIG. 6A shows an example of the information stored in a storage apparatus 600 of the terminal 210. FIG. 6B shows an example of the information stored in a storage apparatus 610 of the flow template manager 100. FIG. 6C shows an example of the information stored in a storage apparatus 620 of the node manager 120. FIG. 6D shows an example of the information stored in a storage apparatus 630 of the flow development manager 220.

The storage apparatus 600 of the terminal 210 has a client program 601 for displaying the screens shown in FIG. 3A to FIG. 3C and FIG. 4. An example of the client program 601 may be a web browser.

The storage apparatus 610 of the flow template manager 100 includes a GUI display processing unit 611, the used-node extraction processing unit 101, the text search processing unit 102, the similar flow search processing unit 103, the synonym calculation processing unit 104, the display flow template selection processing unit 105, the flow simplification processing unit 106, the flow abstraction processing unit 107, the flow split processing unit 108, the flow similarity relation seeking processing unit 109, the flow similarity calculation processing unit 110, the flow template table 111, the flow table 112, a contents table 612, a used-node list 613, a synonym list 614, a display flow template list 615, a node importance list 616, an abstract flow list 617, a split flow list 618, and a similar flow template list 619.

The GUI display processing unit 611 is an example of the flow template output unit 130, and implements the GUI in cooperation with the client program 601. For example, the GUI display processing unit 611 transmits, to the client program 601, a searched result for a search request from the client program 601 as screen information. Note that the screen information transmitted by the GUI display processing unit 611 may be operated by the client program 601 on the storage apparatus 600 of the terminal 210 such as JAVASCRIPT® or may be operated by using a client GUI other than the client program 601 on the storage apparatus 600 of the terminal 210, such as a dedicated application.

The storage apparatus 620 of the node manager 120 includes a node management processing unit 621, the node table 121, a node category table 622, and an external service table 623.

The storage apparatus 630 of the flow development manager 220 includes a flow execution environment 631 that is an execution environment of the flows and a flow editor GUI display processing unit 632 that provides a flow editor GUI.

The flow editor GUI display processing unit 632 implements the GUI in cooperation with the client program 601. For example, in a case where the client program 601 is a web browser, the flow editor GUI display processing unit 632 displays a screen on the client program 601 by returning HTML (HyperText Markup Language), JAVASCRIPT, or the like in response to a request from the client program 601. In addition, when the client program 601 is a dedicated client application (desktop application or the like), the flow editor GUI display processing unit 632 may be an API server or the like.

Details of each of the above programs, tables, and lists will be described later.

Note that the storage apparatus 600 of the terminal 210, the storage apparatus 610 of the flow template manager 100, the storage apparatus 620 of the node manager 120, and the storage apparatus 630 of the flow development manager 220 may be storage apparatuses or may work on a database coupled to a network, a virtual server, or the like.

<Explanation of Tables and Lists>

FIG. 7A to FIG. 7J are charts showing examples of tables and lists held by the storage apparatus 610 of the flow template manager 100. The tables are provided in advance in the flow template manager 100, and the lists are generated in the process of the processing or as a result of the processing executed by the flow template manager 100.

The flow template table 111 shown in FIG. 7A is the table managing the information of the flow templates.

The flow template table 111 has: flow template ID 701 intrinsically allocated to each flow template; flow template name 702; flow template outline 703; flow template description 704; flow template category 705; flow ID 706 associated with the flow table 112; contents ID 707 associated with the contents table 612; and registration date 708 to the flow template table 111.

The flow template name 702 is displayed in flow template name 321 on the flow template information display screen 320.

The flow template outline 703 may be a text itself that describes the outline of the flow template or may be a pointer that shows a stored place of a file in which the text is written. The flow template outline 703 is displayed on the flow template outline screen 323 on the flow template information display screen 320.

The flow template description 704 may be texts that are detailed descriptions themselves such as the contents of the flow template, background of the development, the purpose, and an example of applied scene, or may be a pointer that shows a stored place of a file in which the texts are written. Further, the file format may be a text format or may be markup languages such as an HTML format and a Markdown format supposing display on a browser. The flow template description 704 is displayed in the description display area 325 on the description screen 324 of the flow template information display screen 320.

The category 705 includes a single or a plurality of category names defined in advance by the person who manages the flow template. Alternatively, the flow template manager 100 may have a table configured with category names defined by the person managing and category IDs allocated thereto, respectively, and the corresponding category IDs may be registered. Alternatively, the registrant of the flow template may freely define a single or a plurality of categories, or there may be both the categories defined in advance by the person managing and the categories defined by the registrant. The category 705 is displayed in a selection part of the category filter 312 on the display option selection screen 310 and in a display part of the flow template category 322 on the flow template information display screen 320.

In a case of the flow template configured with a plurality of flows, there may be a plurality of values in the flow ID 706.

The flow template table 111 may include information regarding the flow template other than those mentioned above, such as information regarding the registrant, information regarding the version, cumulative number of downloaded times theretofore, and the like.

The flow table 112 shown in FIG. 7B is a table that manages the data related to the flows (flow data) of each of the flow templates.

The flow table 112 includes intrinsic flow ID 711 allocated to each flow, node ID 712 used in the flows, node coupling relation 713 within the flows, and instance object information 714 of each node.

The node ID 712 is associated with the node table 121 of the node manager 120 to be described later, and a single ID is allocated to a single node.

The node coupling relation 713 keeps the coupling relations between the nodes 421 when the nodes 421 are linked via the lines 422 on the flow editing screen 420 to define the processing order of the nodes 421. The node coupling relation 713 includes node identification ID 713-1, input 713-2, and output 713-3.

The node identification ID 713-1 is an identifier that uniquely shows an instantiated node in the flows.

The input 713-2 includes the node identification ID 713-1 of the node executed before the concerned node. When the concerned node is the first node of the flow and there is no node to be executed before the concerned node, there is a null value or a value indicating the start of the flow.

The output 713-3 includes the node identification ID 713-1 of the node executed after the concerned node. When the concerned node is the last node of the flow and there is no node to be executed after the concerned node, there is a null value or a value indicating the end of the flow.

In a case where the coupling relation can be grasped only with either one of the values, it is not necessary to have both values of the input 713-2 and the output 713-3.

The instance object information 714 includes definition information such as URL (Uniform Resource Locator) showing the destination of the instance executing the nodes of each flow, variable definition, and comments. Further, in a case where the developer of the flow can arbitrarily designate the external service to be called by the node for each node, the instance object information 714 includes the coupling method to the external service, coupling destination information, and the like. Further, the flow template manager 100 may have a table like the external service table 623 (details thereof will be described later) the node manager 120 has, and may refer to the information thereof.

The contents table 612 shown in FIG. 7C is a table that manages contents such as the related material of each of the flow templates. The contents table 612 includes contents ID 721 and contents 722. In the contents 722, entity of access destination information of the related material or link information is stored.

The used-node list 613, the synonym list 614, the display flow template list 615, the node importance list 616, the abstract flow list 617, the split flow list 618, and the similar flow template list 619 to be described later are information stored as temporal processing. Therefore, those lists may not be stored at all times on the storage apparatus 610 of the flow template manager 100 but may be included in each calculation program.

The used-node list 613 shown in FIG. 7D is a list acquired as a result of the processing of the used-node extraction processing unit 101. The used-node list 613 manages the nodes used in the flows of the flow templates managed by the flow template manager 100.

The used-node list 613 includes used-node ID 731 showing the IDs of the nodes used in the flows of the whole flow templates managed by the flow template manager 100, and number of use 732 showing the number of times each of the nodes is used. Note that the generating method thereof will be described later.

The synonym list 614 shown in FIG. 7E is a list acquired as a result of the processing of the synonym calculation processing unit 104 that is called in the process of the processing executed by the text search processing unit 102. The synonym list 614 includes search word 741 inputted by the user 140, synonym 742 for the search word 741, and similarity 743 between the search word 741 and the synonym 742. Note that the generating method thereof will be described later.

The display flow template list 615 shown in FIG. 7F is a list acquired as a result of the processing of the display flow template selection processing unit 105 that is called in the process of the processing executed by the text search processing unit 102. The display flow template list 615 manages the result of search for the flow templates acquired by the search word inputted by the user 140. The display flow template list 615 includes flow template ID 751, score 752 used for determining whether or not to display as the result of search, and search result display determination 753 showing the result of determination regarding whether or not to display as the result of search. Note that details of the generating method thereof will be described later.

The node importance list 616 shown in FIG. 7G is a list acquired as a result of the calculation processing of the importance of the nodes executed by the similar flow search processing unit 103. The node importance list 6161 manages the importance of the nodes used in the flow templates managed by the flow template manager 100. The node importance list 616 includes: used-node ID 761 registered by referring to the used-node ID 731 of the used-node list 613 of the flow template manager 100; importance 762 showing the calculated result of the importance of the nodes; and determination 763 showing the result of determination regarding whether or not each of the nodes is important. Note that details of the generating method thereof will be described later.

The abstract flow list 617 shown in FIG. 7H is a list acquired as a result of the processing of the flow abstraction processing unit 107 that is called in the process of the processing executed by the similar flow search processing unit 103. The abstract flow list 617 includes: intrinsic flow ID 771 allocated to each of the flows; node ID 772 used in the flows; node coupling relation 773 within the flows; and instance object information 774 of each of the nodes. The node coupling relation 773 includes node identification ID 773-1, input 773-2, and output 773-3. Note that details of the generating method thereof will be described later.

The split flow list 618 shown in FIG. 7I is a list acquired as a result of the processing of the flow split processing unit 108 that is called in the process of the processing executed by the similar flow search processing unit 103. The split flow list 618 includes: flow ID 781 of the flow before being split; split ID 782 showing the flow IDs after being split; node ID 783 used in the flows; node coupling relation 784 within the flows; and instance object information 785 of each of the nodes. The node coupling relation 784 includes node identification ID 784-1, input 784-2, and output 784-3. Note that details of the generating method thereof will be described later.

The similar flow template list 619 shown in FIG. 7J is a list acquired as a result of the processing of the similar flow search processing unit 103. The similar flow template list 619 includes: text search flow template ID 791 showing the same contents as those of the flow template ID of the display flow template list 615; similar simplified flow ID 792 showing the IDs of the simplified flows acknowledged to have a similarity relation by the processing to be described later; similar flow template ID 793 showing the ID of the flow template as the base of the simplified flow; flow similarity 794 showing the similarity between the flows; and search result display determination 795 showing the result of determination regarding whether or not to display the flow template on the search result.

FIG. 8A to FIG. 8C are charts showing examples of tables held in the storage apparatus 620 of the node manager 120.

The node table 121 shown in FIG. 8A manages information of the nodes used in the visual programming tool.

The node table 121 includes: node ID 801 uniquely allocated to each of the nodes; node category ID 802 showing categories of each of the nodes; node name 803 showing the names of each of the nodes; node description 804 in which the contents of the nodes are described;

external service ID 805 showing the IDs of the external services to which the nodes are coupled; and processing code 806 showing the processing to be executed by the nodes.

The node category ID 802 is associated with the node category table 622. Note that the node table 121 may hold the node category names themselves, or the node category ID 802 may not be provided (may not necessarily need to be categorized).

The node description 804 includes detailed descriptions regarding the function of the concerned node, the input value, the output value, the variable, and the like. The format thereof may be a text that is the description itself of the node or may be something like a pointer that indicates the stored place of a file in which the text is written. Further, the file format may be a text format or may be markup languages such as an HTML format and a Markdown format supposing display on a browser. The node description 804 is displayed on the node information display screen 423 of the flow editing screen 420.

The external service ID 805 includes a single or a plurality of external service IDs called by the nodes, and associated with the external service table 623. The external service ID 805 may have a null value or a value indicating that there is no call when the node does not call any external services or may have an external service ID indicating that there is no call. Note that the external service uniquely decided to be called by the concerned node is registered in the external service ID 805. In a case where the developer of the flow can arbitrarily designate the external service to be called by each node, the external service ID 805 includes a special value indicating so or the external service ID, and the arbitrary external service to be called is designated in the instance object information 714 of the flow table 112.

The processing code 806 includes codes of the processing performed when the nodes are executed. The processing code 806 may be the processing code itself or may be a pointer that shows a stored place of a file in which the processing code is written.

Note that the node table 121 may have meta information such as tags of the nodes and information of creators.

The node category table 622 shown in FIG. 8B manages the category information of the nodes.

The node category table 622 includes node category ID 811 uniquely allocated to each of the categories, and category name 812 showing the names of the categories. The node category table 622 may have descriptions and the like of each of the categories.

The external service table 623 shown in FIG. 8C manages the information used when the nodes call the external services.

The external service table 623 includes: external service ID 821 uniquely allocated to each of the external services; external service name 822; and coupling information 823 such as URL of the external service to be coupled and the coupling method. In the external service table 623, there may also be a special ID indicating no coupling to the external service, and a special ID indicating that the developer of the flow can arbitrarily designate an external service to be called by each node. The external service table 623 may also have descriptions of the external services, names of providers, contact addresses, update dates, version information, and other information related to the external services.

<<Explanation of Flowcharts>>
<Processing for Generating Used-Node List>

FIG. 9 is a chart showing an example of a flowchart related to the processing executed by the used-node extraction processing unit 101. The following processing is executed by being triggered by a command for generating the used-node list 613 (call of the used-node extraction processing unit 101) from the flow template manager 100.

First, in step S901, the used-node extraction processing unit 101 refers to the flow table 112 of the flow template manager 100 and selects one flow ID 711 (flow).

Next, in step S902, the used-node extraction processing unit 101 selects one node ID 712 (node) used in the selected flow ID 711.

Then, in step S903, the used-node extraction processing unit 101 checks whether or not the selected node ID 712 is included in the used-node ID 731 of the used-node list 613. The used-node extraction processing unit 101 shifts the processing to step S904 when it is not included, and shifts the processing to step S905 when it is included.

Then, in step S904, the used-node extraction processing unit 101 adds the selected node ID 712 to the used-node ID 731 of the used-node list 613.

Then, in step S905, the used-node extraction processing unit 101 adds "1" to the corresponding number of use 732 of the used-node list 613.

Then, in step S906, the used-node extraction processing unit 101 checks whether the node of the selected node ID 712 is the last node of the selected flow ID 711. The used-node extraction processing unit 101 shifts the processing to step S907 when it is the last node, and returns the processing to step S902 when it is not the last node.

Then, in step S907, the used-node extraction processing unit 101 checks whether or not the flow of the selected flow ID 711 is the last flow of the flow table 112. The used-node extraction processing unit 101 shifts the processing to step S908 when it is the last flow, and returns the processing to step S901 when it is not the last flow.

At last, in step S908, the used-node extraction processing unit 101 returns the result thereof and ends the processing.

<Search Using Text Information>

Figure 10:
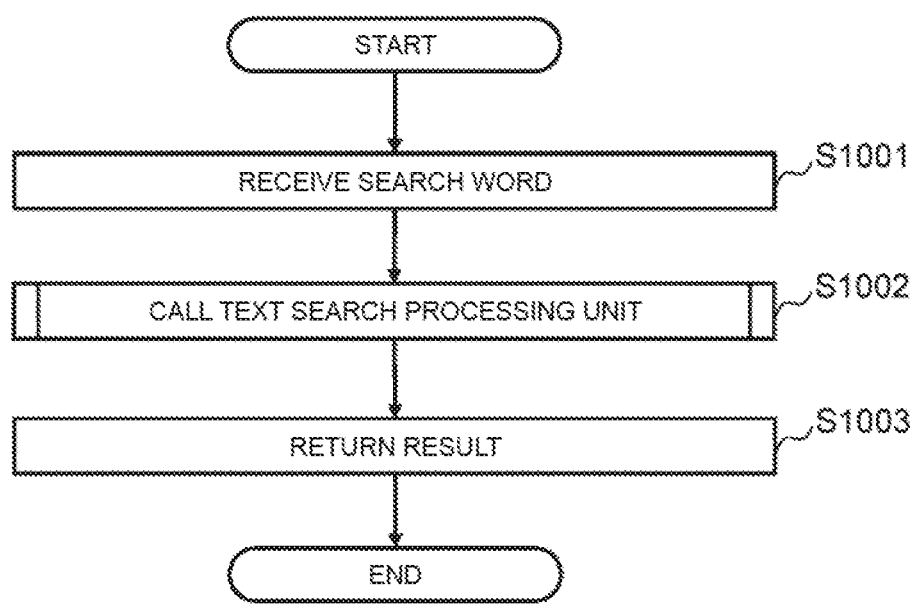
FIG. 10 is a chart showing an example of a flowchart related to processing executed by a flow template manager according to the first embodiment.

FIG. 10 is a chart showing an example of a flowchart related to search processing using text information. The following processing is executed by being triggered when the user 140 inputs a search word into the search word input field 302 on the flow template list screen 300 displayed by the client program 601 of the terminal 210.

First, in step S1001, the flow template manager 100 receives the search word inputted by the user 140.

Then, in step S1002, the flow template manager 100 calls the text search processing unit 102 and generates the display flow template list 615 by running a search for the flow templates based on the search word. Note that details of the processing will be described later.

At last, in step S1003, the flow template manager 100 returns the result. For example, the flow template manager 100 transmits the display flow template list 615 to the client program 601 as the search result, and the client program 601 displays the search result on the flow template list screen 300.

Note here that the display order of the flow templates conforms to the order selected by the user 140 in the sorting order 311 of the display option selection screen 310. For example, when the user 140 selects the recommended order, the GUI display processing unit 611 or the client program 601 sorts out the flow templates in descending order of the score 752 of the display flow template list 615. Note that the user 140 may or may not be able to refer to the values in the score 752 on the GUI. Further, when the flow template table 111 has the number of downloaded times theretofore, the GUI display processing unit 611 or the client program 601 may rearrange the flow templates in descending order of the number of downloaded times.

Note that user 140 may receive the display flow template list 615 as data without displaying the search result on the terminal 210.

Further, the search word to be inputted may not have to be only one. When there are a plurality of search words received, the flow template manager 100 executes step S1002 to call the text search processing unit 102 for each of the search words, combines the display flow template lists 615 of each of the search words, and executes the processing of step S1003.

Figure 11:
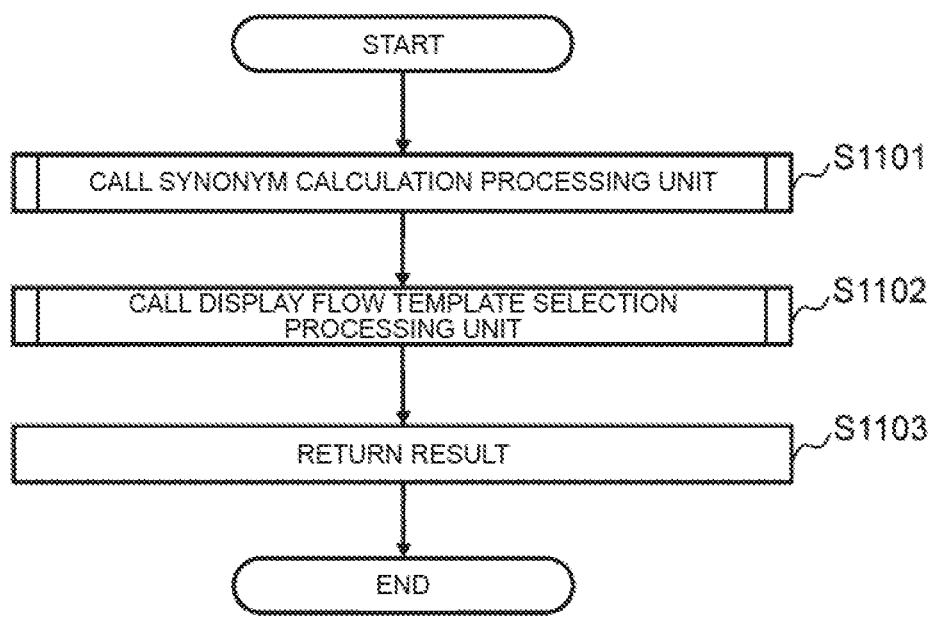
FIG. 11 is a chart showing an example of a flowchart related to processing executed by a text search processing unit according to the first embodiment.

FIG. 11 is a chart showing an example of a flowchart related to the processing executed by the text search processing unit 102. The following processing is executed by being triggered when the flow template manager 100 calls the text search processing unit 102.

First, in step S1101, the text search processing unit 102 calls the synonym calculation processing unit 104 and calculates the synonyms for the search word to generate the synonym list 614. Note that details of the processing will be described later.

Then, in step S1102, the text search processing unit 102 calls the display flow template selection processing unit 105, selects the flow templates to be displayed as the search result by referring to the flow template table 111 and the synonym list 614, and generates the display flow template list 615. Note that details of the processing will be described later.

At last, in step S1103, the text search processing unit 102 returns the result and ends the processing. For example, the text search processing unit 102 returns the display flow template list 615 to the flow template manager 100.

Figure 12:
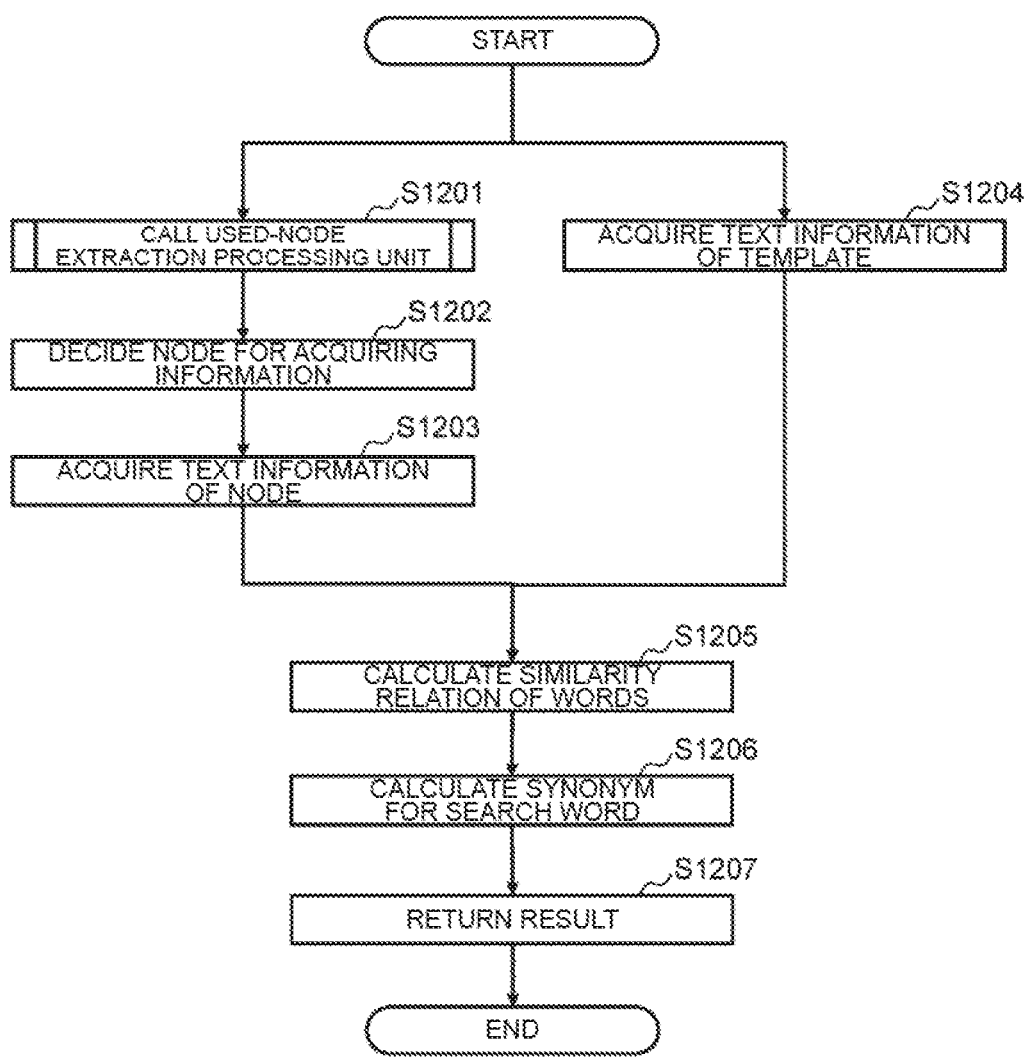
FIG. 12 is a chart showing an example of a flowchart related to processing executed by a synonym calculation processing unit according to the first embodiment.

FIG. 12 is a chart showing an example of a flowchart related to the processing of the synonym calculation processing unit 104 for calculating the synonyms for the search word and for generating the synonym list 614. The following processing is executed by being triggered when the text search processing unit 102 of the flow template manager 100 calls the synonym calculation processing unit 104.

The synonyms for the search words are calculated by using similarity relations between words calculated based on the text information registered in the flow template table 111 and information of the nodes used in the flow templates (flows). An example of the method for calculating the similarity relations between the words may be word2vec (MIKOLOV, Tomas, et al, "Efficient estimation of word representations in vector space", arXiv preprint arXiv: 1301.3781, 2013). This is the method that vectorizes word meanings from alignment of the words in a text, and is capable of calculating the similarity between the words. Hereinafter, a case of calculating the similarity relation between words by using word2vec will be described as an example.

In step S1201, the synonym calculation processing unit 104 calls the used-node extraction processing unit 101 and generates the used-node list 613.

After step S1201, the synonym calculation processing unit 104 executes step S1202 to decide the nodes to be the target for acquiring the node information by referring to the used-node list 613. Thereby, the nodes can be carefully selected by using the information of the flows managed by the flow template manager 100. The nodes as the target for acquiring the information may be the entire nodes included in the used-node list 613 or may be selected still more carefully based on the number of use, the categories of the nodes, the node importance list 616 to be described later, and the like.

After step S1202, the synonym calculation processing unit 104 executes step S1203 to refer to the node table 121 of the node manager 120 by using the node IDs of the nodes decided as the target for acquiring the information in step S1202 and acquires the node name 803 of the target nodes and text information such as the node description 804. At this time, when the corresponding node category table 622 has the node category name and the description thereof and when the external service table 623 has the external service name and the description thereof, the synonym calculation processing unit 104 may acquire the texts of those. Further, it is considered that the nodes generated originally by the developer are registered in a source code management service of software development such as GitHub (https://github.com/) and in the original database of the developer, so that the synonym calculation processing unit 104 may refer to those and acquire the information corresponding to the text information such as the node name 803 and the node description 804.

Further, in step S1204, the synonym calculation processing unit 104 refers to the flow template table 111 and acquire the text information such as the flow template name 702, the flow template outline 703, and the flow template description 704. Further, the text information may be extracted from the contents 722 associated with each of the flow templates.

Note that step S1201, step S1202, step S1203, and step S1204 can be executed in parallel to each other.

Then, in step S1205, the synonym calculation processing unit 104 calculates the vectors for the words included in the text information by using the text information acquired in step S1203 and step S1204. Note that the synonym calculation processing unit 104 may calculate the vectors for the entire words included in the text information or may calculate the vectors for a part of the words included in the text information (for example, words extracted by performing filtering based on the part of speech, the number of appearance, the frequency of appearance, and the like). At this time, in addition to the text information acquired in step S1203 and step S1204, general technical documentation, documents, and the like may be used for supplementing lack of terms.

Then, in step S1206, the synonym calculation processing unit 104 calculates the similarity between the vector of the search word and the vectors of the other words. The synonym calculation processing unit 104 provides a threshold value in the order rearranged from the closest vector distance, defines the words within the threshold value as the synonyms for the search word, and takes the vector distance as the similarity with respect to the search word to generate the synonym list 614. Note that the threshold value may be provided to the vector distance itself or may be provided to both the order and the value.

At last, in step S1207, the synonym calculation processing unit 104 returns the result and ends the processing. For example, the synonym calculation processing unit 104 gives the synonym list 614 to the text search processing unit 102.

Figure 13:
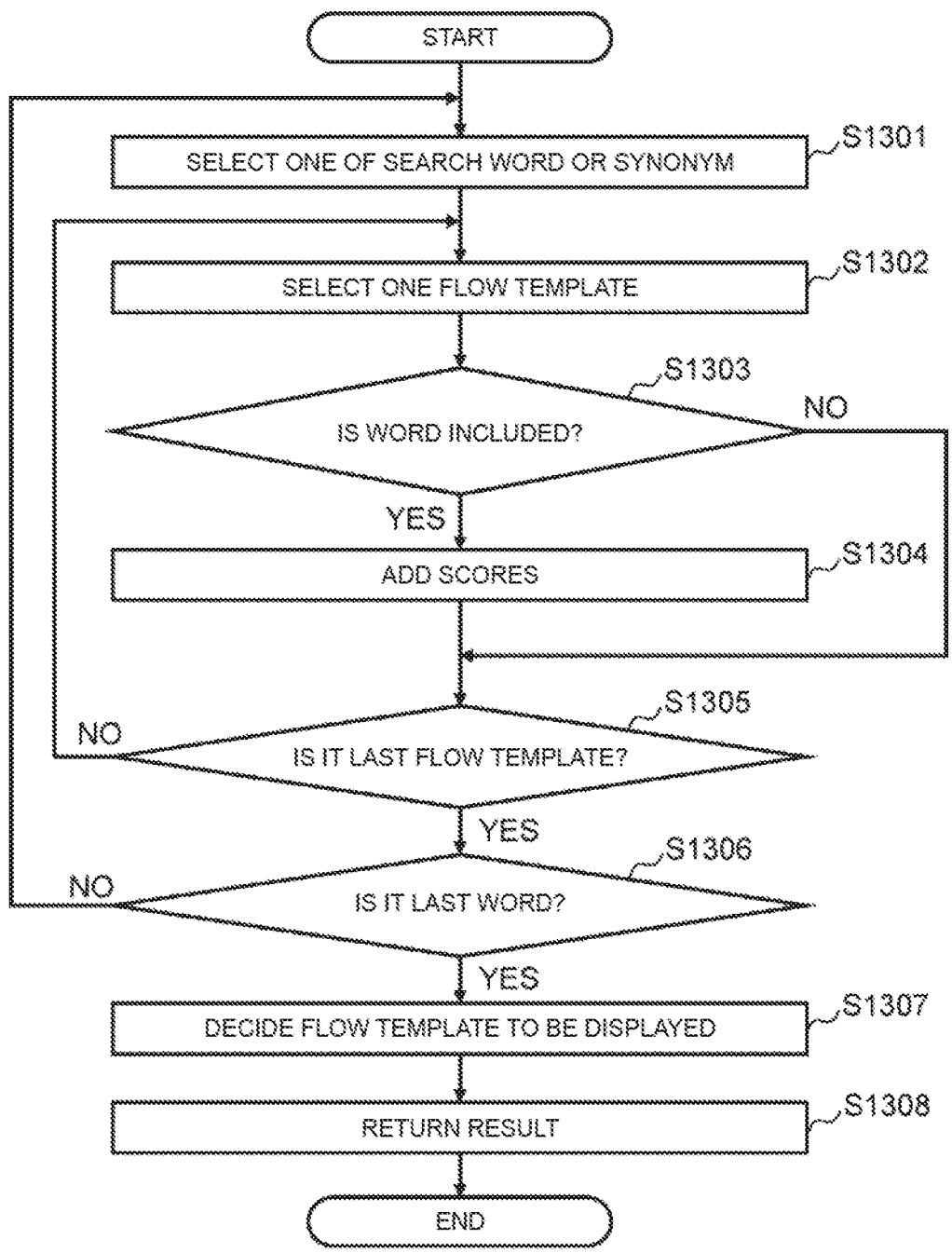
FIG. 13 is a chart showing an example of a flowchart related to processing executed by a display flow template selection processing unit according to the first embodiment.

FIG. 13 is a chart showing an example of a flowchart related to the processing of the display flow template selection processing unit 105 for selecting the flow templates to be displayed as the search result by referring to the flow template table 111 and the synonym list 614 and for generating the display flow template list 615. The following processing is executed by being triggered when the text search processing unit 102 of the flow template manager 100 calls the display flow template selection processing unit 105.

First, in step S1301, the display flow template selection processing unit 105 selects either the search word 741 or the synonym 742 of the synonym list 614 generated by the synonym calculation processing unit 104.

Then, in step S1302, the display flow template selection processing unit 105 refers to the flow template table 111 of the flow template manager 100 and selects one flow template ID 701 (flow template).

Then, in step S1303, the display flow template selection processing unit 105 checks whether or not the selected word (the search word 741 or the synonym 742) is included in the flow template name 702, the flow template outline 703, or the flow template description 704 of the flow template selected in step S1302. The display flow template selection processing unit 105 shifts the processing to step S1304 when included, and shifts the processing to step S1305 when not included.

Then, in step S1304, the display flow template selection processing unit 105 adds a score value to the score 752 of the corresponding flow template ID 751 of the display flow template list 615. For this addition, the similarity 743 on the synonym list 614 is added. When the included word is the search word, the similarity "1" (100%) is added.

As other methods for adding the score value, it is also possible to employ: a method that adds up a fixed value (for example, "1") regardless of whether the included word is the search word or the synonym and the similarity of the synonym; a method that adds a large score value (a first value such as "10") only in a case of the search word, and adds a small value (a second value that is smaller than the first value, such as "1") in a case of the synonym; a method that decides a reference value in advance, and adds, to the score value, a value acquired by multiplying a bias value to the reference value based on whether the included word is the search word or the synonym and based on the similarity of the synonym; a method that changes the similarity according to the number of included synonyms; and the like. Further, it is also possible to change the score value according to the items the word is included.

Then, in step S1305, the display flow template selection processing unit 105 checks whether or not the selected flow template is the last flow template. The display flow template selection processing unit 105 shifts the processing to step S1306 when it is the last flow template, and shifts the processing to step S1302 when it is not the last flow template.

Then, in step S1306, the display flow template selection processing unit 105 checks whether or not the selected word is the last word (synonym) in the synonym list 614. The display flow template selection processing unit 105 shifts the processing to step S1307 when it is the last word, and returns the processing to step S1301 when it is not the last word.

Then, in step S1307, the display flow template selection processing unit 105 decides the flow template to be displayed. For example, the display flow template selection processing unit 105 compares the score 752 on the display flow template list 615 with the threshold value defined in advance to determine whether or not to display the flow template as the search result, and stores the result in the search result display determination 753.

At last, in step S1308, the display flow template selection processing unit 105 returns the result and ends the processing. For example, the display flow template selection processing unit 105 gives the display flow template list 615 to the text search processing unit 102.

<Search Using Text Information and Flow Information>

Figure 14:
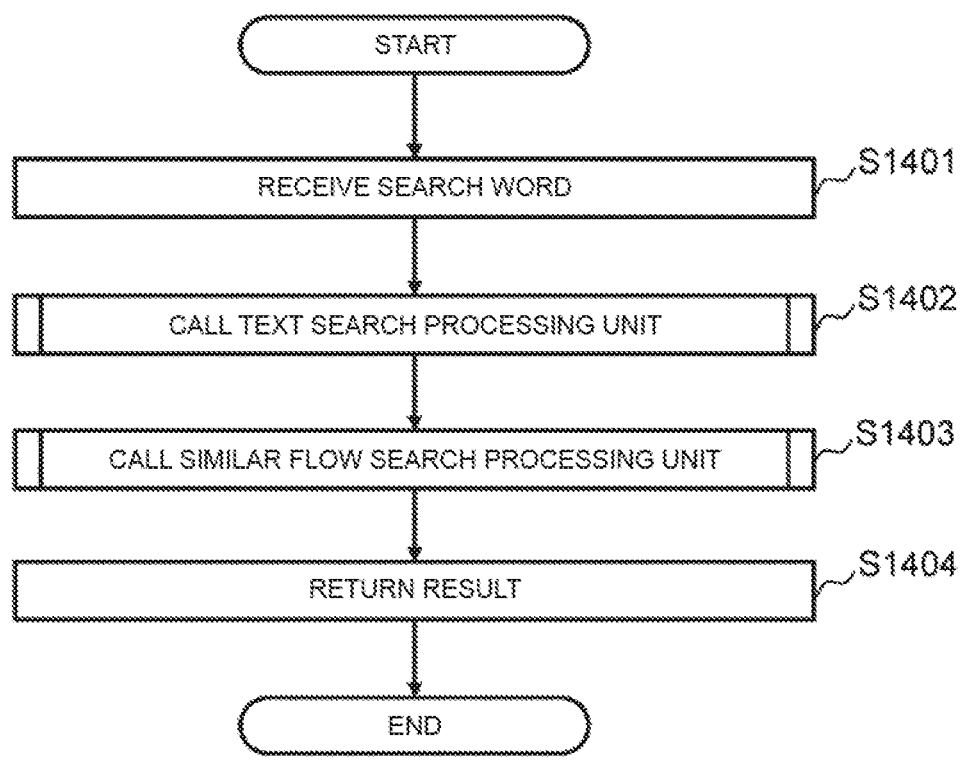
FIG. 14 is a chart showing an example of a flowchart related to processing executed by the flow template manager according to the first embodiment.

FIG. 14 is a chart showing an example of a flowchart related to search processing using text information and flow information. The following processing is executed by being triggered when the user 140 inputs a search word into the search word input field 302 on the flow template list screen 300 displayed by the client program 601 of the terminal 210.

First, in step S1401, the flow template manager 100 receives the search word inputted by the user 140.

Then, in step S1402, the flow template manager 100 calls the text search processing unit 102 and generates the synonym list 614 and the display flow template list 615 based on the search word.

At this time, the text search processing unit 102 may register the search word 741 in the synonym list 614 without calling the synonym calculation processing unit 104 in step S1101, and may select the flow template to be displayed for the search word 741 by the display flow template selection processing unit 105 called in step S1102. Further, because it is possible to take the information of the flows registered in the flow template manager 100 into consideration when searching for the templates by running a search for the similar flows by calling the similar flow search processing unit 103 in step S1403 to be described later, the information of the nodes used in the flows acquired in step S1201, step S1202, and step S1203 may not need to be used when calculating the similarity relations between the words in step S1205 executed by the synonym calculation processing unit 104 that is called by the text search processing unit 102 in step S1101.

Then, in step S1403, the flow template manager 100 calls the similar flow search processing unit 103 to search for the flow templates having the flows similar to the flows of the flow templates determined to be displayed as the search result in the search result display determination 753 of the display flow template list 615, and generate the similar flow template list 619. Note that details of the processing will be described later.

At last, in step S1404, the flow template manager 100 returns the result and ends the processing. For example, the flow template manager 100 transmits the display flow template list 615 and the similar flow template list 619 to the client program 601 as the search result. The client program 601 displays the search result on the flow template list screen 300.

The display order of the flow templates conforms to the order selected by the user 140 in the sorting order 311 of the display option selection screen 310. For example, when the user 140 selects the recommended order, the GUI display processing unit 611 or the client program 601 sorts out the search result of the flow templates acquired based on the text in descending order of the score 752 of the display flow template list 615. Then, after the search result of the flow templates acquired based on the text, the search result of the corresponding similar flows is subsequently displayed in descending order of the flow similarity 794 according to the similar flow template list 619.

Further, it is also possible to gather the flow templates of the display flow template list 615 as the search result of the flow templates acquired based on the text in the first half of the display, and to collectively display the flow templates of the similar flow template list 619 in the latter half. Note that the user 140 may or may not be able to refer to the values in the score 752 and the flow similarity 794 on the GUI. Further, when the flow template table 111 has the number of downloaded times theretofore, the GUI display processing unit 611 or the client program 601 may rearrange the flow templates in descending order of the number of downloaded times.

Note that the user 140 may receive the display flow template list 615 and the similar flow template list 619 as data without displaying the search result on the terminal 210.

Further, the search word to be inputted may not have to be only one. When there are a plurality of search words received, the flow template manager 100 executes step S1402 to call the text search processing unit 102 and execute step S1403 to call the similar flow search processing unit 103 for each of the search words, combines the display flow template lists 615 and the similar flow template lists 619 of each of the search words, and executes the processing of step S1404.

Figure 15:
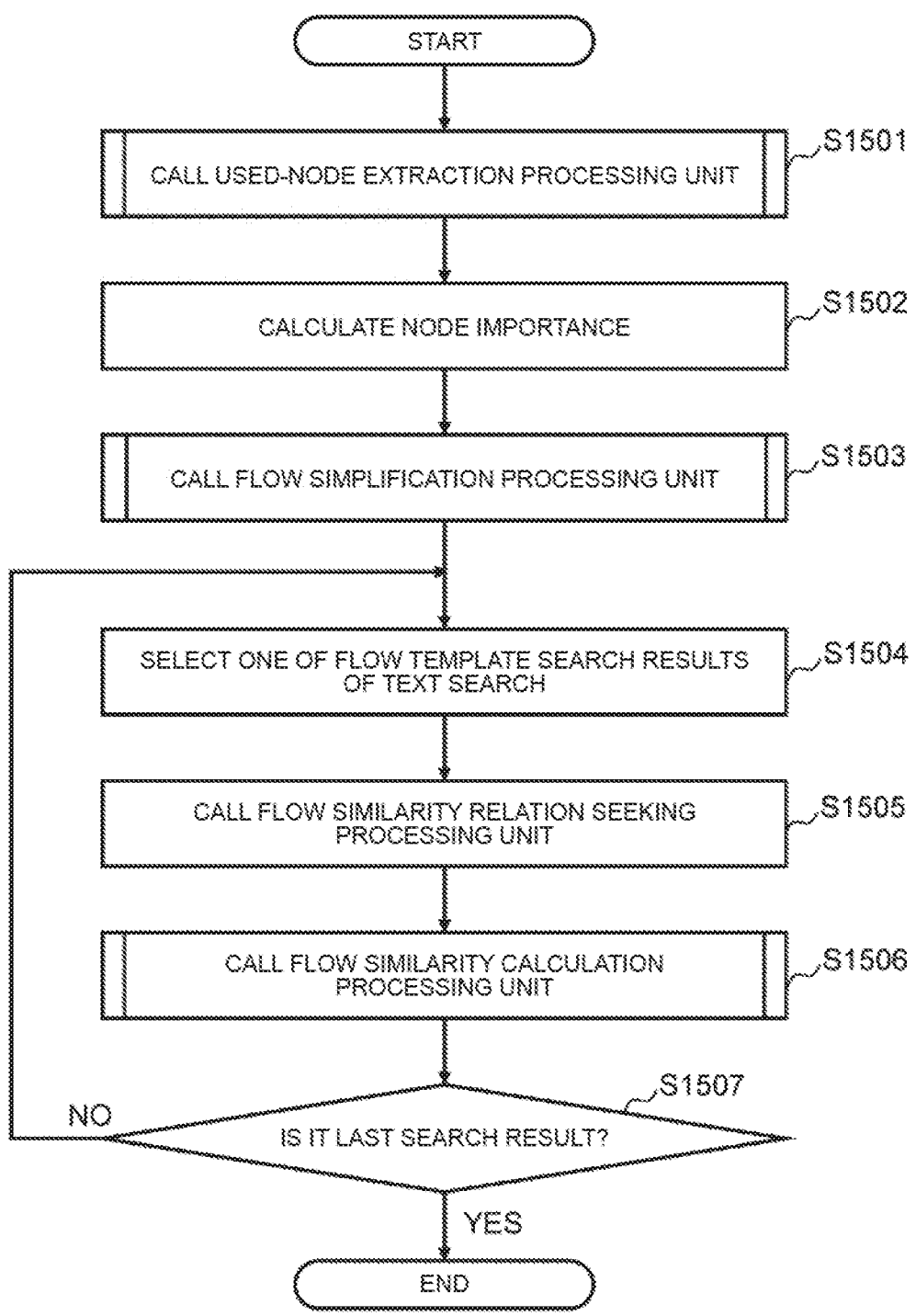
FIG. 15 is a chart showing an example of a flowchart related to processing executed by a similar flow search processing unit according to the first embodiment.

FIG. 15 is a chart showing an example of a flow chart related to processing executed by the similar flow search processing unit 103 to search for the flow templates having the flows similar to the flows of the flow templates determined to be displayed as the search result in the search result display determination 753 of the display flow template list 615, and generate the similar flow template list 619. The following processing is executed by being triggered when the flow template manager 100 calls the similar flow search processing unit 103.

First, in step S1501, the similar flow search processing unit 103 calls the used-node extraction processing unit 101 to generate the used-node list 613.

Then, in step S1502, the similar flow search processing unit 103 generates the node importance list 616 by using the used-node list 613, the node table 121 of the node manager 120, the node category table 622, and the external service table 623. Calculation examples of the node importance 762 will be shown hereinafter.

As an example of the method for calculating the importance of the node, there is a method that calculates and utilizes the use frequency by each node by dividing the number of use 732 of each used-node in the used-node list 613 by the total of the number of use 732. The similar flow search processing unit 103 defines the importance according to the calculation result of the use frequency. For example, the node of high use frequency can be used for general purposes such as doing a simple calculation of four fundamental rules and kick of flows, while the node of low use frequency is considered to be highly probable to carry out characteristic processing within the flows. Therefore, it is considered to increase the importance as the use frequency becomes lower and to decrease the importance as the use frequency becomes higher.

As another example, the similar flow search processing unit 103 may refer to the node category table 622 of the node manager 120, and increase the importance of the node belonging to the category that is highly probable to execute the characteristic processing within the flows. Further, the similar flow search processing unit 103 may refer to the external service table 623 of the node manager 120, and increase the importance of the node that calls the external service considering that such node executes important processing in the coupling destination.

The method for calculating the importance of the nodes such as the examples described above may be used alone or may be used in combination.

An example of the method for calculating the determination 763 is to make determination by providing a threshold value for the calculation result of the importance 762. Further, it may be defined in advance to determine a specific node, and a node corresponding to a specific category of the node category table 622 and a specific service of the external service table 623 as important. Further, it is also possible to make the determination based on both the importance 762 and the definition defined in advance.

Then, in step S1503, the similar flow search processing unit 103 calls the flow simplification processing unit 106 and generates the simplified flows that are used when calculating the similarity relations of the flows based on the node importance list 616 generated in step S1502. Note that details of the processing will be described later.

Then, in step S1504, the similar flow search processing unit 103 selects one flow template ID 751 (flow template) from the display flow template list 615 generated in step S1402 (selects one search result of the flow template acquired by text search).

Then, in step S1505, the similar flow search processing unit 103 calls the flow similarity relation seeking processing unit 109. The flow similarity relation seeking processing unit 109 checks whether or not there is a similarity relation between the simplified flow of the flow template selected in step S1504 and the simplified flows of the other flow templates by using the flows simplified by the flow simplification processing unit 106. When there is a flow acknowledged to have a similarity relation, the flow similarity relation seeking processing unit 109 registers the corresponding simplified flow ID to the similar simplified flow ID 792 of the similar flow template list 619 and registers the corresponding flow template ID to the similar flow template ID 793, respectively. When there are a plurality of simplified flows for a single flow template, the flow similarity relation seeking processing unit 109 checks the similarity relation of the whole simplified flows.

As an example of the method for checking the similarity relation of the flows executed by the flow similarity relation seeking processing unit 109, it is considered to use Graph Edit Distance (GED). In that case, it is possible to use complete match in the node ID 801 of the node table 121 or to use the similarity between the nodes by utilizing the node category ID 802 or the external service ID 805 of the node table 121.

Then, in step S1506, the similar flow search processing unit 103 calls the flow similarity calculation processing unit 110 to calculate the similarity between the flows of the pairs acknowledged to have the similarity relation between the flows by the flow similarity relation seeking processing unit 109, and registers the similarity to the flow similarity 794 of the similar flow template list 619 while registering, to the search result display determination 795, whether or not to display the corresponding flow template as the similar flow template. As for the flow used at this time, the flow similarity calculation processing unit 110 may use the simplified flows generated by the flow simplification processing unit in step S1503 or may use the complete flows. Note that details of the processing will be described later.

Then, in step S1507, the similar flow search processing unit 103 checks whether or not the flow template selected in step S1504 is the last flow template (search result) of the display flow template list 615. The similar flow search processing unit 103 ends the processing when it is the last flow template, and returns the processing to step S1504 when it is not the last flow template.

Note that it is also possible to execute the processing of the flow similarity relation seeking processing unit 109 and the flow similarity calculation processing unit 110 called in step S1505 and step S1506 by using the complete flow without performing step S1503 executed by the flow simplification processing unit 106. Further, it is also possible to use both the complete flow and the simplified flow.

Figure 16:
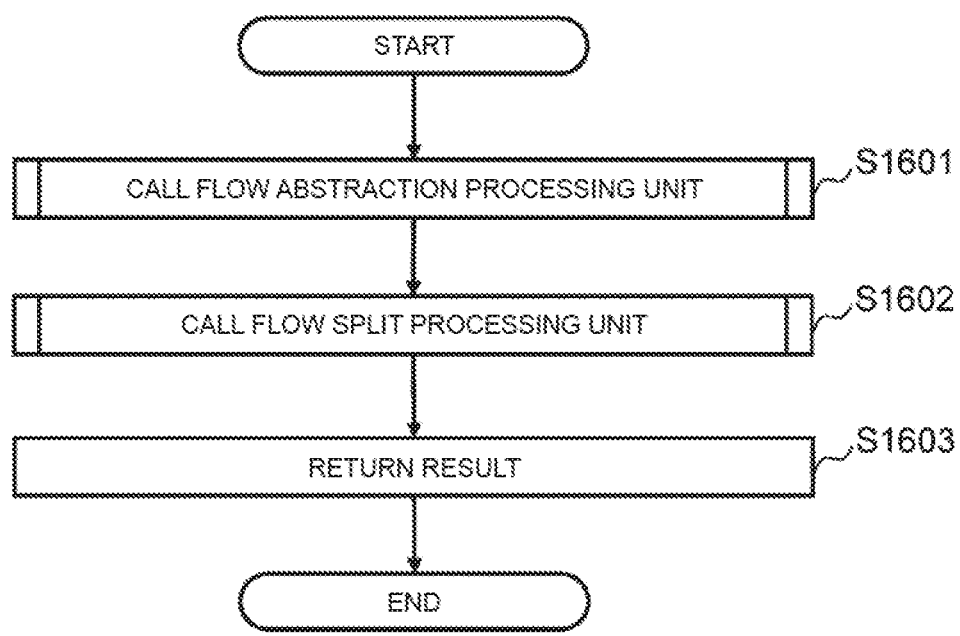
FIG. 16 is a chart showing an example of a flowchart related to processing executed by a flow simplification processing unit according to the first embodiment.
Figure 17C:
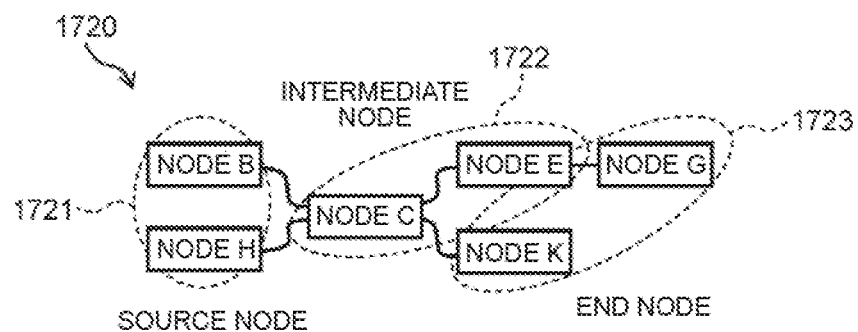
FIG. 17C is a diagram for describing simplification of a flow according to the first embodiment.
Figure 17D:
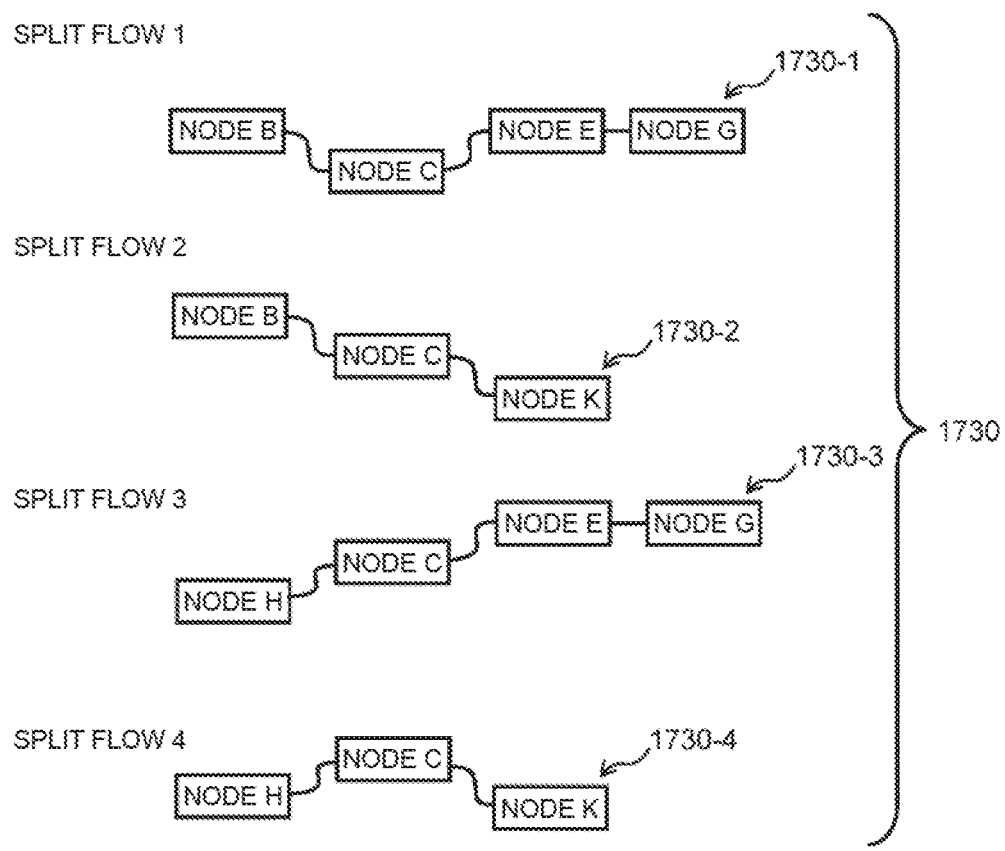
FIG. 17D is a diagram for describing simplification of a flow according to the first embodiment.

FIG. 16 is a chart showing an example of a flowchart related to processing executed by the flow simplification processing unit 106. The following processing is executed by being triggered when the similar flow search processing unit 103 of the flow template manager 100 calls the flow simplification processing unit 106. The flow simplification processing unit 106 simplifies each of the flows according to the node importance list 616 generated by the similar flow search processing unit 103 in step S1502. FIG. 17C and FIG. 17D show schematic diagrams of the flows generated by such processing.

First, in step S1601, the flow simplification processing unit 106 calls the flow abstraction processing unit 107 to express and abstract each of the flows with an important node considered to carry out a characteristic function according to the node importance list 616, and generates the abstract flow list 617.

Then, in step S1602, the flow simplification processing unit 106 calls the flow split processing unit 108 to split each of the flows to pairs of flows in which the source node or the end node does not branch, and generates the split flow list 618.

At last, in step S1603, the flow simplification processing unit 106 returns the result and ends the processing. For example, the flow simplification processing unit 106 gives the split flow list 618 to the similar flow search processing unit 103.

FIG. 17A to FIG. 17D are diagrams for describing simplification of the flows. FIG. 17A to FIG. 17D are referred as appropriate when describing FIG. 18 and FIG. 19.

Figure 18:
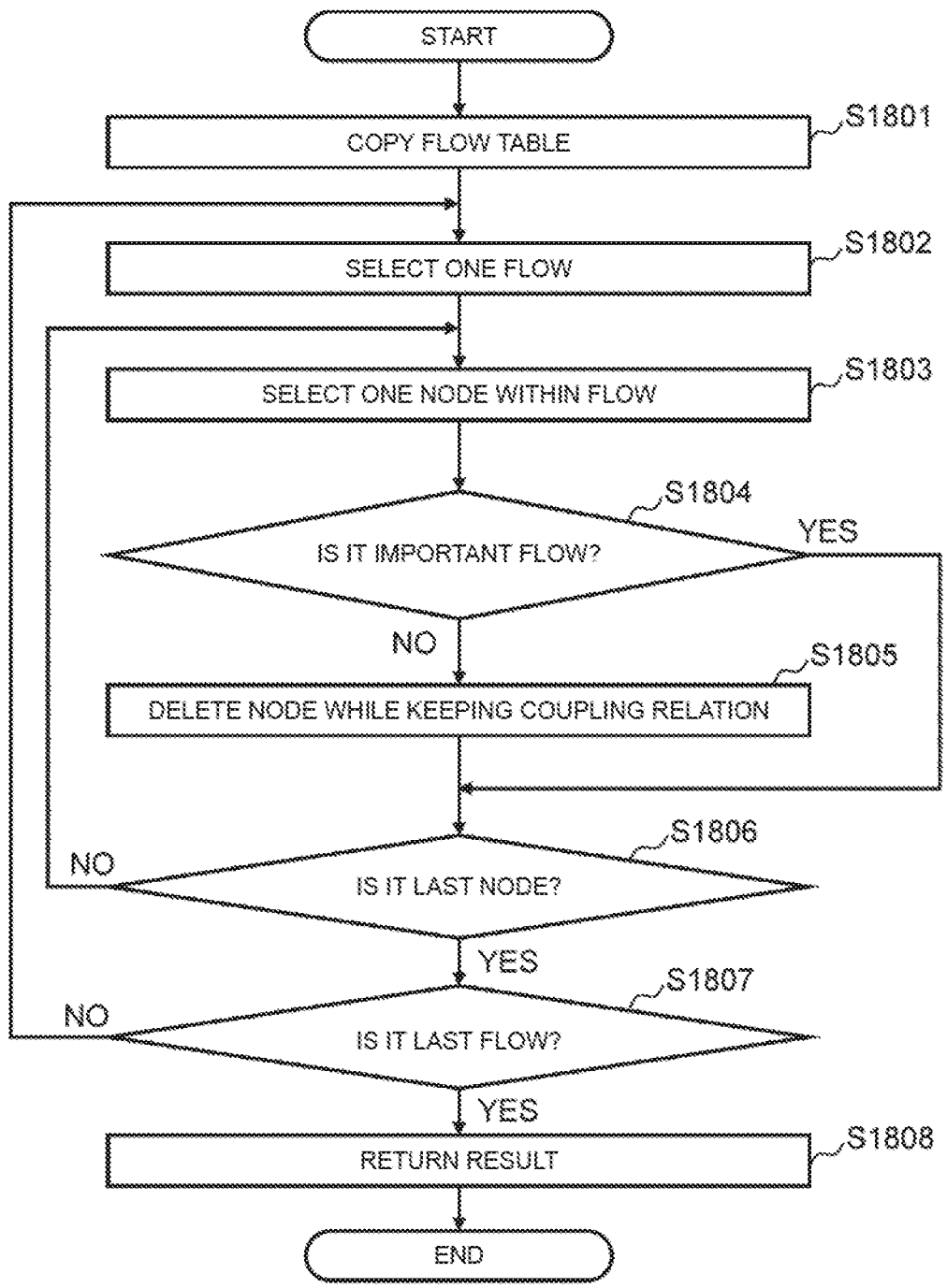
FIG. 18 is a chart showing an example of a flowchart related to processing executed by a flow abstraction processing unit according to the first embodiment.

FIG. 18 is a chart showing an example of a flowchart related to processing executed by the flow abstraction processing unit 107 to express and abstract each of the flows with an important node considered to carry out a characteristic function according to the node importance list 616.

Processing shown in FIG. 18 corresponds to the processing for converting a flow 1700 before being abstracted shown in FIG. 17A to a flow 1720 after being abstracted shown in FIG. 17C. The following processing is executed by being triggered when the flow simplification processing unit 106 calls the flow abstraction processing unit 107.

First, in step S1801, the flow abstraction processing unit 107 copies the flow table 112 of the flow template manager 100 to generate an abstract flow list 1710. The list shown in FIG. 17B is an example of the abstract flow list 1710 generated by copying the flow table 112. In the following explanation, it is assumed that the flow 1700 of FIG. 17A corresponds to the flow of "flow-100" in the flow ID 771 of the abstract flow list 1710 shown in FIG. 17B. The abstract flow list 1710 is rewritten by flow abstraction processing executed hereinafter into the abstract flow list 617 shown in FIG. 7H at last, and information showing the flow 1720 after being abstracted remains therein.

Then, in step S1802, the flow abstraction processing unit 107 selects one flow ID 771 (flow) of the abstract flow list 1710.

Then, in step S1803, the flow abstraction processing unit 107 selects one node ID 772 (node) of the selected flow ID.

Then, in step S1804, the flow abstraction processing unit 107 collates the selected node ID 772 with the used-node ID 761 of the node importance list 616 to check whether or not it is the important node by referring to the determination 763 of the corresponding node. The flow abstraction processing unit 107 shifts the processing to step S1805 when it is not the important node because such node is a deletion target, and shifts the processing to step S1806 when it is the important node. For the sake of explanations, asterisk (*) is applied to the important nodes 1701 while no mark is applied to the nodes 1702 that are the deletion target.

Then, in step S1805, the flow abstraction processing unit 107 deletes the information of the corresponding node from the abstract flow list 1710 while keeping the coupling relation. That is, the processing rewrites the node identification ID of the output 773-3 of the node having the node identification ID 773-1 registered in the input 773-2 of the deletion-target node to the node identification ID registered in the output 773-3 of the deletion-target node, rewrites the node identification ID of the input 773-2 of the node having the node identification ID 773-1 registered in the output 773-3 of the deletion-target node to the node identification ID registered in the input 773-2 of the deletion-target node, and then delete the information of the deletion-target node.

Then, in step S1806, the flow abstraction processing unit 107 checks whether or not the selected node is the last node of the flow. The flow abstraction processing unit 107 shifts the processing to step S1807 when it is the last node, and returns the processing to step S1803 when it is not the last node.

Then, in step S1807, the flow abstraction processing unit 107 checks whether or not the selected flow is the last flow. The flow abstraction processing unit 107 shifts the processing to step S1808 when it is the last flow, and returns the processing to step S1802 when it is not the last flow.

At last, in step S1808, the flow abstraction processing unit 107 returns the result and ends the processing. For example, the flow abstraction processing unit 107 gives the abstract flow list 1710 (abstract flow list 617) to the flow simplification processing unit 106.

Figure 19:
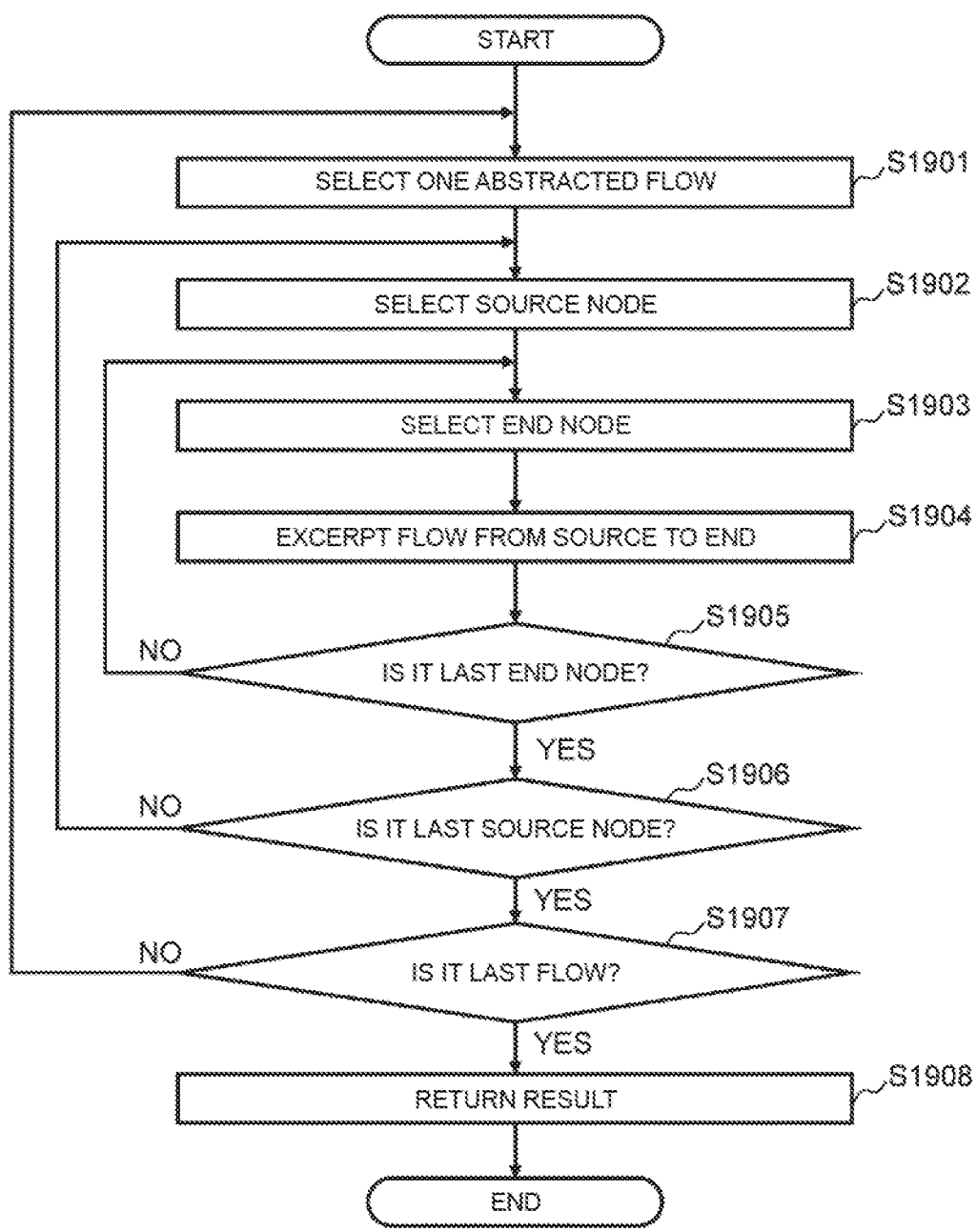
FIG. 19 is a chart showing an example of a flowchart related to processing executed by a flow split processing unit according to the first embodiment.

FIG. 19 is a chart showing an example of a flowchart related to processing of the flow split processing unit 108 to split the flow abstracted by the flow abstraction processing unit 107 into pairs of flows in which the source node or the end node of the flow does not branch. This processing corresponds to the processing for converting the abstracted flow 1720 shown in FIG. 17C into the split flow 1730 shown in FIG. 17D. The following processing is executed by being triggered when the flow simplification processing unit 106 calls the flow split processing unit 108.

Note here that when the user 140 develops a new application by referring to the flow templates registered in the flow template manager 100, there may be a case where it is desired to use only one input or output even if the application registered in advance has a plurality of inputs or outputs and a case where it is desired to use a combination of a plurality of those. Therefore, it becomes possible to deal with both cases by running a search after splitting the flow. The information of the split flows is registered in the split flow list 618.

First, in step S1901, the flow split processing unit 108 selects one flow ID 771 (abstracted flow) from the abstract flow list 617 generated by the processing of the flow abstraction processing unit 107.

Then, in step S1902, the flow split processing unit 108 selects one source node 1721 to be the source of the selected flow. Note here that the source node 1721 means the node having no input 773-2.

Then, in step S1903, the flow split processing unit 108 selects one end node 1723 to be the end of the selected flow. Note here that the end node 1723 means the node having no output 773-3.

Then, in step S1904, the flow split processing unit 108 excerpts the flow from the source node 1721 selected in step S1902 to the end node 1723 selected in step S1903, and registers it to the split flow list 618. When there is a path branched once and then the branches come together on the way from the source node 1721 to the end node 1723, each of the branches may be registered, the branches may collectively be registered as a single flow, or both may be registered.

Then, in step S1905, the flow split processing unit 108 checks whether or not the end node 1723 selected in step S1903 is the last end node. The flow split processing unit 108 shifts the processing to step S1906 when it is the last end node, and returns the processing to step S1903 when it is not the last end node.

Then, in step S1906, the flow split processing unit 108 checks whether or not the source node 1721 selected in step S1902 is the last source node. The flow split processing unit 108 shifts the processing to step S1907 when it is the last source node, and returns the processing to step S1902 when it is not the last source node.

Then, in step S1907, the flow split processing unit 108 checks whether or not the flow selected in step S1901 is the last flow. The flow split processing unit 108 shifts the processing to step S1908 when it is the last flow, and returns the processing to step S1901 when it is not the last flow.

At last, in step S1908, the flow split processing unit 108 returns the result and ends the processing. For example, the flow split processing unit 108 gives the split flow list 618 to the flow simplification processing unit 106.

In the above, the processing for abstracting the flow held in the flow table 112 by the flow abstraction processing unit 107 and then splitting the flow by the flow split processing unit 108 is described as an example of the processing executed by the flow simplification processing unit 106. However, the method for simplifying the flow is not limited to that described above, and the flow simplification processing unit 106 may simply generate the abstracted flow by executing the processing of the flow abstraction processing unit 107 or may simply split the flow by executing the processing of the flow split processing unit 108.

Figure 20:
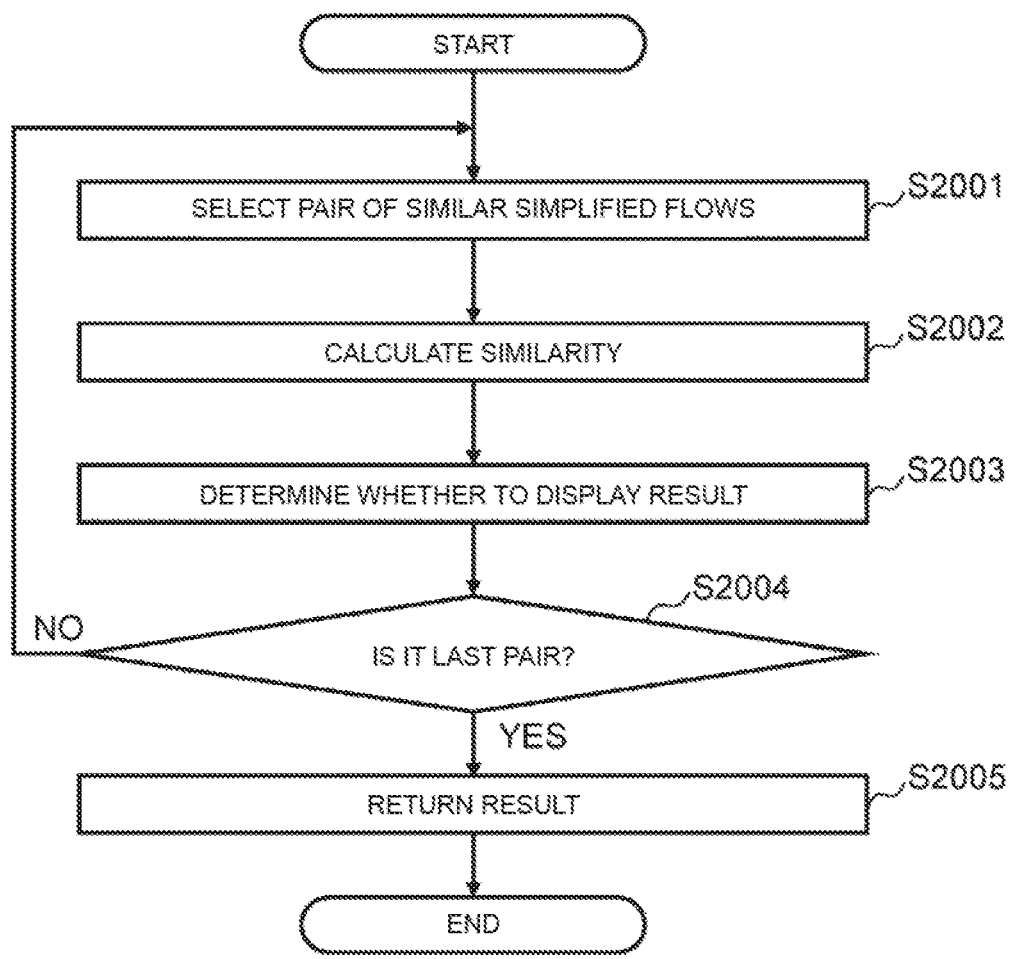
FIG. 20 is a chart showing an example of a flowchart related to processing executed by a flow similarity calculation processing unit according to the first embodiment.

FIG. 20 is a chart showing an example of the flowchart related to the processing of the flow similarity calculation processing unit 110 to calculate the similarity between the flows of the pair acknowledged to have the similarity relation between the flows as a result of the processing executed by the flow similarity relation seeking processing unit 109, and determine whether or not to display the corresponding flow template as the similar flow template. The following processing is executed by being triggered when the similar flow search processing unit 103 of the flow template manager 100 calls the flow similarity calculation processing unit 110.

First, in step S2001, the flow similarity calculation processing unit 110 selects one pair of similar simplified flows from the similar flow template list 619.

Then, in step S2002, the flow similarity calculation processing unit 110 calculates the flow similarity 794 of the pair of the selected simplified flows.

As an example of the method for calculating the similarity, there is a method that calculates the similarity by paying attention to the source node 1721 and the end node 1723 of the simplified flow. When the user 140 develops a new application by referring to the flow template registered in the flow template manager 100, there may often be cases where there are certain data the user 140 would like to input and the result the user 140 desires to acquire based thereupon, so that the user 140 desires to refer to the processing contents with which the desired result can be acquired. Therefore, it is expected to be able to acquire the search result more suited for the purpose by calculating the similarity by paying attention to the source and end of the flows.

As the method for calculating the similarity by paying attention to the source node 1721 and the end node 1723, for example, it is considered to set, in a pair of simplified flows: the similarity as the highest (first similarity that is the highest) when the source nodes 1721, the intermediate nodes 1722, and the end nodes 1723 all match; the similarity as the second highest (second similarity that is lower than the first similarity) when both the source nodes 1721 and the end nodes 1723 match; the similarity to be little lower (third similarity that is lower than the second similarity) when either the source nodes 1721 or the end nodes 1723 match; and the similarity as the lowest (fourth similarity that is lower than the third similarity) when both the source nodes 1721 and the end nodes 1723 do not match.

In this case, the similarity may be changed according to the matching proportion of the intermediate node 1722 existing between the source node 1721 and the end node 1723. For example, the flow similarity calculation processing unit 110 increases the similarity as the matching proportion becomes higher. Further, the similarity may be changed according to the importance 762 by referring to the node importance list 616. For example, the flow similarity calculation processing unit 110 increases the similarity as the importance becomes higher.

Note here that when checking matching of the nodes, perfect matching in the node ID 801 of the node table 121 (node ID 772 of the abstract flow list 617, node ID 783 of the split flow list 618) may be checked, or the similarity may be biased by utilizing the node category ID 802, the external service ID 805, and the like of the node table 121.

As another example of the method for calculating the similarity, it is possible to use the similarity that is acquired in the method used when checking the similarity between the simplified flows in step S1505 if the similarity can be acquired with that method, and also possible to combine the similarity calculated by paying attention to the source nodes 1721 and the end nodes 1723 of the simplified flows.

Then, in step S2003, the flow similarity calculation processing unit 110 compares the flow similarity 794 with the threshold value defined in advance to determine whether or not to display as the search result, and stores the result in the search result display determination 795.

Then, in step S2004, the flow similarity calculation processing unit 110 checks whether or not the pair of the selected simplified flows is the last pair. The flow similarity calculation processing unit 110 shifts the processing to step S2005 when it is the last pair, and returns the processing to step S2001 when it is not the last pair.

At last, in step S2005, the flow similarity calculation processing unit 110 returns the result. For example, the flow similarity calculation processing unit 110 gives the similar flow template list 619 to the similar flow search processing unit 103.

With the embodiment, when searching for the flow templates of the applications developed by the visual programming tool, for example, it is possible to present the related flow template based on the text information and the flow information. This makes it possible to supplement information not registered in the text affixed to the flow templates from the applications, so that it is possible to present the flow template that is more suited for the purpose of the user.

(2) Second Embodiment

In the first embodiment, described is the example where a search for the flow templates is triggered when the user 140 inputs a search word in the search word input field 302 of the flow template list screen 300. However, in the process of the search, it takes time to execute prescribed processing (to generate the used-node list 613 by the used-node extraction processing unit 101, to generate the similarity relation of the words by the calculation processing of the similarity relation of the words executed by the synonym calculation processing unit 104, to generate the node importance list 616 by the calculation processing of the importance of the nodes executed by the similar flow search processing unit 103, to generate the abstract flow list 617 by the flow abstraction processing unit 107, to generate the split flow list 618 by the flow split processing unit 108, to register the similar flow template ID 793 of the similar flow template list 619 by seeking the flow similarity relation by the flow similarity relation seeking processing unit 109, to register the flow similarity 794 and the search result display determination 795 of the flow template list 619 by the flow similarity calculation processing executed by the flow similarity calculation processing unit 110, and the like), so that presentation of the search result to the user 140 may be delayed.

In order to improve it, the time required to present the search result after inputting a search word can be shortened by executing such time-consuming processing described above in advance, keeping the processing result in the storage apparatus 610 of the flow template manager 100, and referring thereto at the time of running a search. The place for keeping the processing result is not limited to the storage apparatus 610 of the flow template manager 100, but it is also possible to provide a database that is accessible via a network and hold the processing result in the database or to hold the processing result in the storage apparatus 600 of the terminal 210.

In the embodiment, processing that does not use the search word is executed in advance. More specifically, as the processing that can be applied may be generation of the used-node list 613 by the used-node extraction processing unit 101, generation of the similarity relation of the words by the calculation processing of the similarity relation of the words executed by the synonym calculation processing unit 104 (step S1201 to step S1205), generation of the node importance list 616 by the calculation processing of the importance of the nodes executed by the similar flow search processing unit 103 (step S1502), generation of the abstract flow list 617 by the flow abstraction processing unit 107, generation of the split flow list 618 by the flow split processing unit 108, registration of the similar flow template ID 793 of the similar flow template list 619 by seeking the flow similarity relation by the flow similarity relation seeking processing unit 109 (step S1505), registration of the flow similarity 794 and the search result display determination 795 of the flow template list 619 by the flow similarity calculation processing executed by the flow similarity calculation processing unit 110 (step S1506), and the like.

For example, generation of the used-node list 613 by the used-node extraction processing unit 101 may be executed by being triggered when a new flow template is added to the flow template table 111 or may be executed by being triggered when the existing flow template is updated. Further, it is also possible to define the update frequency in advance such as once a day, once in several days, once a week, or once a month, and execute the used-node extraction processing unit 101 at such timing. Furthermore, it is also considered to define the time zone or the like such as the middle of the night or holidays where there are less users 140 of the flow template manager 100 as the time allowed to execute the used-node extraction processing unit 101, and update the used-node list 613 at the timing where a new flow template is added to the flow template table 111 or in the execution allowable time closest from the timing of update.

Generation of the similarity relation of the words by the calculation processing of the similarity relation of the words executed by the synonym calculation processing unit 104, generation of the node importance list 616 by the calculation processing of the importance of the nodes executed by the similar flow search processing unit 103, generation of the abstract flow list 617 by the flow abstraction processing unit 107, generation of the split flow list 618 by the flow split processing unit 108, registration of the similar flow template ID 793 of the similar flow template list 619 by seeking the flow similarity relation by the flow similarity relation seeking processing unit 109, registration of the flow similarity 794 and the search result display determination 795 of the flow template list 619 by the flow similarity calculation processing executed by the flow similarity calculation processing unit 110 can be executed in advance by being triggered by the fact that the used-node list 613 is generated without waiting for the input of a search word.

However, the processing of the flow simplification processing unit 106 including generation of the abstract flow list 617 by the flow abstraction processing unit 107 and generation of the split flow list 618 by the flow split processing unit 108 in a case of using the result of the calculation processing of the importance of the nodes needs to be executed after generating the node importance list 616 by the calculation processing of the importance of the nodes. In a case of using the abstract flow list 617 for generating the split flow list 618 by the flow split processing unit 108, the split flow list 618 needs to be generated by the flow split processing unit 108 after generating the abstract flow list 617 by the flow abstraction processing unit 107. Similarly, registration of the similar flow template ID 793 of the similar flow template list 619 by seeking the flow similarity relation by the flow similarity relation seeking processing unit 109 needs to be done after generating the split flow list 618 by the flow simplification processing unit 106, and registration of the flow similarity 794 and the search result display determination 795 of the flow template list 619 by the flow similarity calculation processing executed by the flow similarity calculation processing unit 110 needs to be executed after registering the similar flow template ID 793 of the similar flow template list 619 by seeking the flow similarity relation by the flow similarity relation seeking processing unit 109. As long as those restrictions are kept, all of the processing described above may be executed in advance, or may be executed to the halfway thereof in advance and the remaining processing may be executed by being triggered when a searched word is inputted.

In the first embodiment, before the similar flow search processing unit 103 calls the flow similarity relation seeking processing unit 109 in step S1505, one template is selected from the display flow template list 615 that is the output result of the text search processing unit 102 in step S1504, similar flows for the selected flow template are searched in step S1505, and then the similarity between the similar flows that are the search result of the flow similarity calculation processing unit 110 is calculated in step S1506.

However, the search word inputted by the user 140 is necessary for the text search processing unit 102 to generate the display flow template list 615, so that the subsequent processing of the flow similarity relation seeking processing unit 109 and the flow similarity calculation processing unit 110 cannot be executed in advance.

Thus, for shortening the search time by the calculation executed in advance, the processing of the flow similarity relation seeking processing unit 109 and the flow similarity calculation processing unit 110 is executed for all the flows and the results thereof are kept without executing step S1504 by the similar flow search processing unit 103.

Further, even for the processing other than those described above, the processing that can be executed without using the search word inputted by the user 140 in the search word input field 302 of the flow template list screen 300 may be executed in advance without waiting for the input of the search word and the result thereof may be called at the time of running a search.

With the embodiment, it is possible to shorten the time required for presenting the search result from the input of the search word by executing prescribed time-consuming processing in advance, keeping the processing results in the storage apparatus, and referring thereto at the time of running a search.

(3) Third Embodiment

In the first embodiment and the second embodiment, it is assumed to display all the flow templates that are the flow templates acquired by the text search and the flow templates having the flows similar to the flows of the flow templates acquired by the text search based on the search result of the flow templates according to the text and from the search result of the similarity of the flows on the flow template list screen 300. With that, however, there may be a great number of flow templates to be displayed on the flow template list screen 300, so that it may be difficult for the user 140 to find the flow template to be referred to for a new application.

Figure 21:
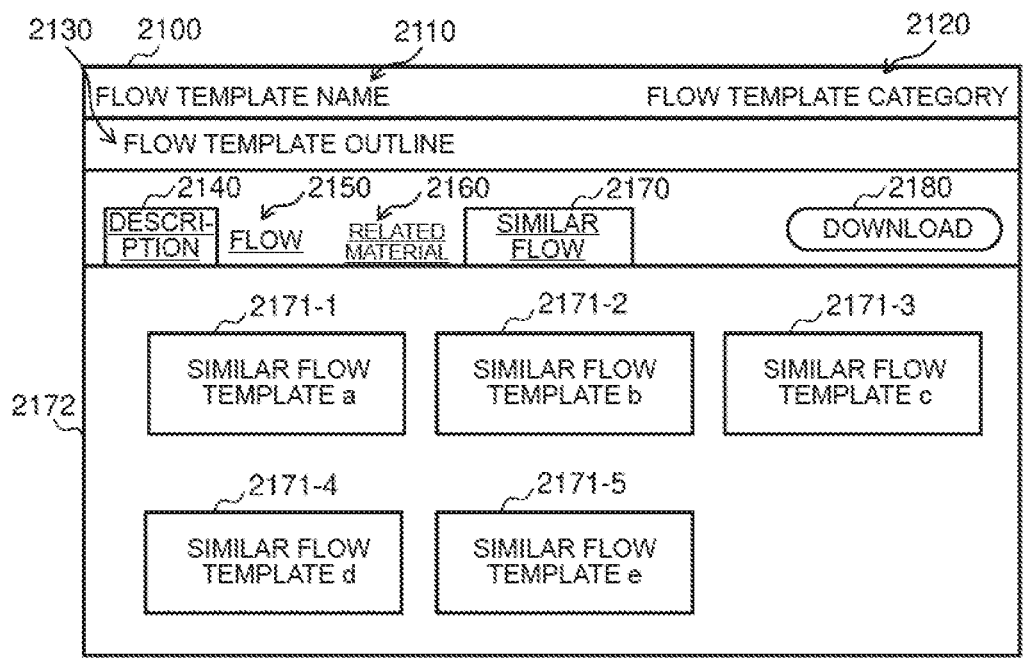
FIG. 21 is a diagram showing an example of a screen according to a third embodiment.

In order to overcome such problem, for example, the GUI is designed such that the search result of the flow templates according to the text is displayed on the flow template list screen 300 and, when the flow template 301 is clicked via a mouse, a flow template information display screen 2100 as shown in FIG. 21 where the information of the similar flow template can be viewed opens in addition to the information of the clicked flow template.

In this case, the display order of the flow templates on the flow template list screen 300 conforms to the order selected by the user 140 in the sorting order 311 of the display option selection screen 310. For example, when the user 140 selects the recommended order, the flow templates are sorted out in descending order of the score 752 of the display flow template list 615. The user 140 may or may not be able to refer to the values in the score 752 on the GUI.

The flow template information display screen 2100 is an example of a screen on which the information of the similar flow templates can be viewed in addition to acquiring the information of the flow templates and downloading the data of the flow templates. The user 140 can refer to the flow template name 2110, the flow template category 2120 and the like. On a flow template outline screen 2130, the user 140 can refer to the outline of the corresponding flow template. Further, on a description screen 2140, the user 140 can refer to detailed descriptions such as contents of the corresponding flow template, the background of development, the purpose, an example of applied scene thereof, and the like. Furthermore, the user 140 can refer to image information of the flow and acquire the contents such as documents from a flow image screen 2150 and a related material 2160. Further, the user 140 can refer to similar flow templates 2171 that have flows similar to the flow of flow template selected on the flow template list screen 300. The display order of the flow templates in a similar flow display area 2172 conforms to the order selected by the user 140 in the sorting order 311 of the display option selection screen 310. For example, when the user 140 selects the recommended order, the flow templates are sorted out in descending order of the flow similarity 794 of the similar flow template list 619. The user 140 may or may not be able to refer to the values in the flow similarity 794 on the GUI.

When the user 140 clicks the similar flow template 2171, the flow template information display screen 2100 of the corresponding flow template is displayed by referring to the information of the flow template table 111 and the information of the similar flow template list 619. Further, it is also possible to refer only to the information of the flow template table 111, and display a screen such as the flow template information display screen 320 carrying no similar flow template information.

Further, the user 140 can download the data of the similar flow template by clicking a download button 2180. By deploying the downloaded data on a visual programming execution environment, the application can be operated.

In addition to be above, two areas that are an area for displaying the flow templates searched based the text information and an area for displaying the similar flow templates searched based on the flow information may be provided on the flow template list screen 300 and, when the user 140 clicks the flow template searched based on the text information, the similar flow templates may be displayed or both may be displayed. The display order of the flow templates and the similar flow templates conforms to the order selected by the user 140 in the sorting order 311 of the display option selection screen 310.

With the embodiment, the user can easily acquire the data of a desired flow template.

(4) Other Embodiments

While the case of applying the present invention to a template search system is described in the embodiments above, the present invention is not limited to that but can be broadly applied to various kinds of other systems, apparatuses, method, and programs.

Further, in the embodiments described above, the "storage apparatus" is at least one out of a memory unit and at least a part of a PDEV unit (typically, at least the memory unit).

Further, in the embodiments described above, the "memory unit" is one or more memories, and may typically be a main storage device. At least one memory in the memory unit may be a volatile memory or may be a nonvolatile memory.

Further, in the embodiment described above, the "PDEV unit" is one or more PDEVs, and may typically be an auxiliary storage device. "PDEV" means a physical storage device, and may typically be a nonvolatile storage device such as an HDD (Hard Disk Drive) or an SSD (Solid State Drive).

Further, in the embodiments described above, the "control apparatus" is one or more processors. At least one of the processors may typically be a microprocessor such as a CPU (Central Processing Unit), but may also be another kind of processor such as a GPU (Graphics Processing Unit). At least one of the processors may be of a single core or of a multi-core. At least one of the processors may be a processor in a broad sense, such as a hardware circuit that executes a part of or a whole part of the processing (for example, FPGA (Field-Programmable Gate Array) or ASIC (Application Specific Integrated Circuit)).

Further, while the processing may be described in the embodiments above by taking the "program" as the subject, the processor may be taken as the subject of the processing because the program, by being executed by the control apparatus, performs the defined processing while using the storage apparatus (for example, the memory) and/or the interface unit (for example, the communication port) as appropriate. The processing described by taking the program as the subject may be defined as the processing executed by the control apparatus or by an apparatus having such control apparatus. Further, the control apparatus may include a hardware circuit that executes a part of or a whole part of the processing (for example, FPGA (Field-Programmable Gate Array) or ASIC (Application Specific Integrated Circuit)). The program may be installed in an apparatus such as a calculator from a program source. The program source may be a program distribution server or a recording medium (for example, a non-transitory recording medium) that can be read by the calculator. Furthermore, in the following explanations, two or more programs may be implemented as a single program, or a single program may be implemented as two or more programs.

Further, in the embodiments described above, the configuration of each table is an example, and a single table may be divided into two or more tables, and a whole part of or a part of two or more tables may be a single table.

Further, while various kinds of data are described in the embodiments above by using XX tables, XX lists, and XX files for convenience' sake, the data configuration is not limited thereto and it is also possible to express the data as XX information or the like.

Further, in the explanations above, the program for implementing each function and the information such as the tables and the files can be stored in a storage apparatus such as a memory, a hard disk, or an SSD (Solid State Drive) or a recording medium such as an IC card, an SD card, or a DVD.

The present invention has following characteristic configurations, for example.

Provided is the template search system (for example, the template search system 1) that manages information (for example, the flow template table 111, the flow table 112, the contents table 612, and the like) of templates (for example, the flow templates) and information (for example, the node table 121, the node category table 622, and the external service table 623) of nodes used in the templates in an associated manner, and the system includes: a processing unit (for example, the flow template manager 100, the processing unit) that calculates a synonym for an inputted search word and/or a flow showing linkage of the nodes used in the template (for example, the template associated with the synonym for the search word, the template having the flow matching or similar to the flow of the template associated with the search word, the template having the flow matching or similar to the flow of the template associated with the synonym for the search word) related to the search word based on the information of the nodes managed by the template search system, and specifies the template associated with the calculated synonym and/or the template having a flow corresponding to the calculated flow based on the information of the templates managed by the template search system; and an output unit (for example, the flow template output unit 130, the output unit) that outputs the information of the template specified by the processing unit.

With the configuration described above, the template associated with the synonym and/or the template having the flow corresponding to the flow of the template related to the search word can be searched as the template similar to the template corresponding to the search word. For example, even if there is a difference in the background, knowledge, and the like among the users so that words and phrases to be used as the search words vary, the users can acquire the template suited for the purpose thereof because the templates similar to the template corresponding to the search word are searched.

The processing unit extracts the nodes used in the template managed in the template search system (for example, step S1201, step S1501), and acquires the information of the extracted nodes from a node information management unit that manages the information of the nodes.

With the configuration described above, for example, information of the nodes used in a search for the templates can be selectively acquired from the information of a large number of nodes managed by the node information management unit so that the information of the nodes to be used can be carefully selected.

The template search system manages text information (for example, the flow template description 704) including words for describing the templates and/or text information (for example, the node description 804, the category name 812, the external service description) including words for describing the nodes (for example, step S1202 to step S1204); and the processing unit calculates the synonym for the search word by determining a similarity relation between the search word and the words included in the text information managed by the template search system (for example, step S1205, step S1206).

With the configuration described above, the synonyms are acquired for the words included in the text information of the templates and/or the text information of the nodes. For example, the synonym is also acquired from the descriptions of the nodes even if there is a word left out from the description of the templates, so that it is possible to decrease the risk of the user becoming unable to acquire the template suited for the purpose.

The processing unit calculates the synonym for the search word targeted at a prescribed node (for example, the node having "True" in the determination 763 of the node importance list 616, the node of low use frequency, the node belonging to the category highly possible to perform the characteristic processing within the flow, the node that calls the external service) that performs important processing among the nodes used in the templates managed by the template search system.

With the configuration described above, for example, accuracy of the search can be improved by eliminating the synonym of the nodes that do not perform importance processing (unnecessary data).

The processing unit calculates similarity between the search word and the words included in the text information managed by the template search system, and calculates, as the synonym, the word whose calculated similarity is in a prescribed highest order, the word whose calculated similarity order exceeds a threshold value, or the word whose calculated similarity is in the prescribed highest order and whose calculated similarity exceeds the threshold value (step S1206).

With the configuration described above, for example, the synonym highly relative to the search word can be acquired, so that the accuracy of the search can be more improved.

The processing unit compares the flow of the template related to the search word (for example, the template associated with the search word, the template associated with the synonym, the template associated with the search word and the synonym for the search word) with the flows of the templates managed by the template search system to specify the template having the flow similar to the flow of the template related to the search word.

Note here that the word may be omitted from the descriptions of the templates and the descriptions of the nodes by the intention of the user, the flows of the templates are not omitted. Therefore, with the configuration described above, even when not many descriptions are registered, for example, the templates having the flows similar to the flow of the template related to the search word can be searched. As a result, the user can acquire the template suited for the purpose.

The template search system manages text information of the templates (for example, the flow template name 702, the flow template outline 703, the flow template description 704, or the like); and the processing unit specifies the template that includes the search word from the text information managed by the template search system, and compares the flow showing linkage of the nodes used in the specified template with the flows of the templates managed by the template search system to specify the template having the flow similar to the flow of the specified template (for example, step S1402, step S1403).

With the configuration described above, the templates associated with the search word are acquired with respect to the words included in the text information of the templates and/or the text information of the nodes. For example, the templates associated with the search word are also acquired from the descriptions of the nodes even if there is a word left out from the descriptions of the templates, so that it is possible to decrease the risk of the user becoming unable to acquire the template suited for the purpose.

The template search system manages text information of the templates (for example, the flow template name 702, the flow template outline 703, the flow template description 704, or the like); and the processing unit specifies the template that includes the synonym for the search word from the text information managed by the template search system, and compares the flow of the specified template with the flows of the templates managed by the template search system to specify the template having the flow similar to the flow of the specified template (for example, step S1402, step S1403).

With the configuration described above, the templates associated with the synonym are acquired with respect to the words included in the text information of the templates and/or the text information of the nodes. For example, the templates associated with the synonym are also acquired from the descriptions of the nodes even if there is a word left out from the descriptions of the templates, so that it is possible to decrease the risk of the user becoming unable to acquire the template suited for the purpose.

The processing unit generates a flow by extracting a prescribed node that performs important processing from the nodes used in the templates managed by the template search system (for example, step S1801 to step S1808), and compares the flows by using the generated flow.

With the configuration described above, by eliminating the node not performing the important processing from the flows, it is possible to avoid such circumstance that the templates are not searched because of the node not performing the importance processing so that accuracy of the search can be improved.

The processing unit generates a flow by splitting the flow showing linkage of the nodes used in the templates managed by the template search system into a flow including a node of one input and a node of one or more output and/or a flow including a node of one or more input and a node of one output (for example, step S1901 to step S1908), and compares the flows by using the generated flow.

With the configuration described above, split of the flow makes it possible to run a partial search. For example, in a case where there is data the user desired to input, in a case where there is data the user desires to acquire, and the like, the template suited for the purpose of the user can be searched more appropriately by splitting the flow by input and/or output.

The processing unit determines a similarity relation between the flow showing the linkage of the nodes used in the template related to the search word and the flow including the nodes similar to the nodes used in the template related to the search word, the flow being in the template managed by the template search system, to specify the template having the flow similar to the flow of the template related to the search word (for example, step S1505).

With the configuration described above, for example, the template having the similar flow can be searched by adding the similarity of the nodes, so that the user can acquire the template suited for the purpose.

The processing unit calculates similarity between the flow of the template related to the search word and the flows of the templates managed by the template search system (for example, step S1506); and the output unit outputs the information of the template according to the similarity calculated by the processing unit (for example, step S1404).

With the configuration described above, for example, the template of high similarity, that is, the template suited for the purpose of the user is preferentially outputted, so that the user can easily acquire a desired template.

The processing unit sets: first similarity that is the highest when a source node, an end node, and an intermediate node between the source node and the end node of the flow of the template related to the search word all match a source node, an end node, and an intermediate node of the flow of the template managed by the template search system; second similarity that is lower than the first similarity when the source nodes and the end nodes match; third similarity that is lower than the second similarity when the source nodes or the end nodes match; and fourth similarity that is lower than the third similarity when both the source nodes and the end nodes do not match (for example, step S2002).

Note here that there are a case where there is data the user desired to input and a case where there is data the user desires to acquire. In such cases, with the configuration described above, the similarity is calculated by paying attention to the source and the end of the flow. Therefore, for example, the user can easily acquire a desired template.

The output unit displays the information of the template specified by the processing unit on a display apparatus (for example, the input/output apparatus 540 of the terminal 210).

With the configuration described above, the information of the templates is displayed, so that the user can check the displayed templates, for example, and acquire the template suited for the purpose.

The processing unit performs one or more settings shown in (A) to (C) in the following.

(A) Set higher priority order for the output when the number of synonyms included in text information of the specified template is greater.

(B) Set higher priority order for the output when the similarity of synonym included in the text information is higher.

(C) Set high priority order for the output when the item where the synonym included in the text information are stored is a prescribed item.

With the configurations described above, for example, the template that has a strong relationship with the synonym, that is, the template suited for the purpose of the user is preferentially outputted, so that the user can easily acquire the template suited for the purpose.

Further, the configurations described may be changed, rearranged, combined, or omitted as appropriate without departing from the scope of the present invention.

REFERENCE SIGNS LIST

1 Template search system
100 Flow template manager
130 Flow template output unit

What is claimed is:

1. A template search system configured to manage information of templates and information of nodes used in the templates in an associated manner, the system comprising:
 a processing unit configured to:
  calculate a synonym for an inputted search word,
  calculate a flow showing linkage of the nodes used in the template related to the search word based on the information of the nodes managed by the template search system,
  specify the template associated with the calculated synonym,
  specify the template having a flow corresponding to the calculated flow based on the information of the templates managed by the template search system,
  compare the flow of the template related to the search word with the flows of the templates managed by the template search system to specify the template having the flow similar to the flow of the template related to the search word,
  calculate similarity between the flow of the template related to the search word and the flows of the templates managed by the template search system, and
  calculate the similarity between the flows, wherein the calculated similarity is selected from the group consisting of:
   a first highest similarity when each of the source node, the end node, and the intermediate node between the source node and the end all match,
   a second similarity, which is lower than the first similarity, when only the source nodes and the end nodes match,
   a third similarity, which is lower than the second similarity, when only the source nodes or only the end nodes match, and
   a fourth similarity, which is lower than the third similarity, when the source nodes and the end nodes do not match; and
 an output unit configured to:
  output the information of the template specified by the processing unit, and
  output the information of the template according to the similarity calculated by the processing unit, wherein each of the flows comprise:
   a source node, an end node, and an intermediate node that exists between the source node and the end node.

2. The template search system according to claim 1, wherein the processing unit is further configured to extract the nodes used in the template managed in the template search system, and
 acquire the information of the extracted nodes from a node information management unit that manages the information of the nodes.

3. The template search system according to claim 1, wherein:
 the template search system is further configured to manage text information including words for describing the templates and/or text information including words for describing the nodes; and
 the processing unit is further configured to calculate the synonym for the search word by determining a similarity relation between the search word and the words included in the text information managed by the template search system.

4. The template search system according to claim 3, wherein the processing unit is further configured to calculate the synonym for the search word targeted at a prescribed node that performs processing among the nodes used in the templates managed by the template search system.

5. The template search system according to claim 3, wherein the processing unit is further configured to:
 calculate similarity between the search word and the words included in the text information managed by the template search system, and
 calculate, as the synonym, the word whose calculated similarity is in a prescribed highest order, the word whose calculated similarity order exceeds a threshold value, or the word whose calculated similarity is in the prescribed highest order and whose calculated similarity exceeds the threshold value.

6. The template search system according to claim 1, wherein:
 the template search system is further configured to manage text information of the templates; and
 the processing unit is further configured to:
  specify the template that includes the search word from the text information managed by the template search system, and
  compare the flow of the specified template with the flows of the templates managed by the template search system to specify the template having the flow similar to the flow of the specified template.

7. The template search system according to claim 1, wherein:
 the template search system is further configured to manage text information of the templates; and
 the processing unit is further configured to
  specify the template that includes the synonym for the search word from the text information managed by the template search system, and
  compare the flow of the specified template with the flows of the templates managed by the template search system to specify the template having the flow similar to the flow of the specified template.

8. The template search system according to claim 1, wherein the processing unit is further configured to:
 generate a flow by extracting a prescribed node that performs processing from the nodes used in the templates managed by the template search system, and
 compare the flows by using the generated flow.

9. The template search system according to claim 1, wherein the processing unit is further configured to:
 generate a flow by splitting the flow showing linkage of the nodes used in the templates managed by the template search system into a flow including a node of one input and a node of one or more output and/or a flow including a node of one or more input and a node of one output, and compare the flows by using the generated flow.

10. The template search system according to claim 1, wherein the processing unit is further configured to determine a similarity relation between the flow showing the linkage of the nodes used in the template related to the search word and the flow including the nodes similar to the nodes used in the template related to the search word, the flow being in the template managed by the template search system, to specify the template having the flow similar to the flow of the template related to the search word.

11. The template search system according to claim 1, wherein the output unit is further configured to display the information of the template specified by the processing unit on a display apparatus.

12. A template search method of a template search system that manages information of templates and information of nodes used in the templates in an associated manner, the method comprising:

calculating, by a processing unit, a synonym for an inputted search word, calculating a flow showing linkage of the nodes used in the template related to the search word based on the information of the nodes managed by the template search system, specifying the template associated with the calculated synonym, specifying the template having the flow corresponding to the calculated flow based on the information of the templates managed by the template search system, comparing, by the processing unit, the flow of the template related to the search word with the flows of the templates managed by the template search system to specify the template having the flow similar to the flow of the template related to the search word, calculating, by the processing unit, similarity between the flow of the template related to the search word and the flows of the templates managed by the template search system, outputting, by an output unit, the information of the template specified by the processing unit, and outputting, by the output unit, the information of the template according to the similarity calculated by the processing unit, wherein each of the flows comprise:

a source node, an end node, and an intermediate node that exists between the source node and the end node; and the method further comprises:

calculating, by the processing unit, the similarity between the flows, wherein the calculated similarity is selected from the group consisting of:

a first highest similarity when each of the source node, the end node, and the intermediate node between the source node and the end all match;

a second similarity, which is lower than the first similarity, when only the source nodes and the end nodes match:

a third similarity, which is lower than the second similarity, when only the source nodes or only the end nodes match; and a fourth similarity, which is lower than the third similarity, when the source nodes and the end nodes do not match.

\* \* \* \* \*